US011004041B2

(12) United States Patent
Stratvert et al.

(10) Patent No.: US 11,004,041 B2
(45) Date of Patent: May 11, 2021

(54) PROVIDING USERS WITH INSIGHTS INTO THEIR DAY

(71) Applicant: Microsoft Technology Licensing, LLC, Redmond, WA (US)

(72) Inventors: Kevin Niels Stratvert, Seattle, WA (US); Ashmeet Oberoi, Kirkland, WA (US); Manikandeswaran Janagaraj, Bellevue, WA (US); Evan Ming Lew, Redmond, WA (US); Sunny Verma, Redmond, WA (US); Arif Saifee, Redmond, WA (US); Andranik Kurghinyan, Mountainview, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 15/245,964

(22) Filed: Aug. 24, 2016

(65) Prior Publication Data

US 2018/0060826 A1    Mar. 1, 2018

(51) Int. Cl.
*G06Q 10/10* (2012.01)
*H04L 12/58* (2006.01)

(52) U.S. Cl.
CPC ....... *G06Q 10/1095* (2013.01); *G06Q 10/107* (2013.01); *G06Q 10/109* (2013.01);
(Continued)

(58) Field of Classification Search
CPC ............. G06Q 10/1095; G06Q 10/109; G06Q 10/107; G06Q 10/06; G06Q 10/06311; H04L 51/02; H04L 51/14; H04L 51/16
See application file for complete search history.

(56) References Cited

U.S. PATENT DOCUMENTS

| 7,109,848 | B2 | 9/2006 | Schybergson |
| 7,757,181 | B2 | 7/2010 | Pan et al. |

(Continued)

FOREIGN PATENT DOCUMENTS

| WO | 2007149649 A2 | 12/2007 |
| WO | 2008025118 A1 | 3/2008 |

(Continued)

OTHER PUBLICATIONS

Miera, "The ultimate guide to Google Now cards", Sep. 5, 2014, pp. 1-10, Mobile Nations, retrieved at <<http://www.androidcentral.com/ultimate-guide-google-now-cards>>.

(Continued)

*Primary Examiner* — Jonathan G Sterrett
*Assistant Examiner* — Stephen S Swartz

(57) ABSTRACT

A user is provided with insights into their upcoming day. One or more calendars for the user are identified. The identified calendars are then heuristically analyzed to calculate one or more insights into an upcoming day for the user, and these calculated insights are provided to the user. One or more electronic messages each of which was received by or sent by the user are also identified. The identified electronic messages are then heuristically analyzed to calculate one or more insights into an upcoming day for the user, and these calculated insights are provided to the user. The identified calendars and the identified electronic messages are also heuristically analyzed together to calculate one or more insights into an upcoming day for the user, and these calculated insights are provided to the user.

20 Claims, 15 Drawing Sheets

(52) U.S. Cl.
CPC .............. *H04L 51/02* (2013.01); *H04L 51/14* (2013.01); *H04L 51/16* (2013.01)

(56) References Cited

U.S. PATENT DOCUMENTS

| | | | | |
|---|---|---|---|---|
| 7,877,409 | B2* | 1/2011 | Lim | G06F 21/604 |
| | | | | 707/781 |
| 8,214,243 | B2* | 7/2012 | Graham | G06Q 10/06 |
| | | | | 705/7.22 |
| 10,417,613 | B1* | 9/2019 | Brisebois | G06N 5/047 |
| 2003/0149606 | A1* | 8/2003 | Cragun | G06Q 10/109 |
| | | | | 705/7.19 |
| 2004/0003042 | A1* | 1/2004 | Horvitz | G06Q 10/109 |
| | | | | 709/204 |
| 2004/0034556 | A1* | 2/2004 | Matheson | G06Q 10/047 |
| | | | | 705/7.24 |
| 2007/0271376 | A1 | 11/2007 | Yach | |
| 2008/0091494 | A1 | 4/2008 | Betancourt et al. | |
| 2008/0140348 | A1* | 6/2008 | Frank | G06Q 10/06 |
| | | | | 702/181 |
| 2009/0132329 | A1* | 5/2009 | Lam | G06Q 10/109 |
| | | | | 705/7.13 |
| 2009/0187449 | A1* | 7/2009 | van Tulder | G06Q 10/06 |
| | | | | 705/7.17 |
| 2009/0210351 | A1* | 8/2009 | Bush | G06Q 10/109 |
| | | | | 705/80 |
| 2010/0217644 | A1* | 8/2010 | Lyle | G06Q 10/063116 |
| | | | | 705/7.16 |
| 2011/0184768 | A1 | 7/2011 | Norton et al. | |
| 2012/0290950 | A1* | 11/2012 | Rapaport | H04L 51/32 |
| | | | | 715/753 |
| 2013/0157699 | A1* | 6/2013 | Talwar | H04L 51/38 |
| | | | | 455/466 |
| 2013/0297551 | A1* | 11/2013 | Smith | G06N 5/02 |
| | | | | 706/48 |
| 2013/0318079 | A1* | 11/2013 | Kindel | G06Q 10/109 |
| | | | | 707/728 |
| 2013/0329527 | A1 | 12/2013 | Alavala et al. | |
| 2014/0035949 | A1 | 2/2014 | Singh et al. | |
| 2014/0244332 | A1* | 8/2014 | Mermelstein | G06Q 10/1093 |
| | | | | 705/7.16 |
| 2015/0006221 | A1* | 1/2015 | Mermelstein | G06Q 10/1093 |
| | | | | 705/7.19 |
| 2015/0113420 | A1 | 4/2015 | Itani et al. | |
| 2015/0161133 | A1 | 6/2015 | Waltermann et al. | |
| 2016/0104094 | A1* | 4/2016 | Yom-Tov | G06Q 10/06395 |
| | | | | 705/7.41 |
| 2016/0350134 | A1* | 12/2016 | VerWeyst | G06F 16/93 |
| 2016/0350721 | A1* | 12/2016 | Comerford | G06Q 10/1095 |
| 2017/0039527 | A1* | 2/2017 | Rangan | G06Q 10/1095 |
| 2017/0098197 | A1* | 4/2017 | Yu | G06F 17/30312 |
| 2017/0236097 | A1* | 8/2017 | Smith | G06Q 10/1095 |
| | | | | 705/7.19 |

FOREIGN PATENT DOCUMENTS

| | | |
|---|---|---|
| WO | 2012051712 A1 | 4/2012 |
| WO | 2015187048 A1 | 12/2015 |

OTHER PUBLICATIONS

"International Search Report and Written Opinion Issued in PCT Application No. PCT/US2017/047252", dated Dec. 14, 2017, 13 Pages.

* cited by examiner

PROVIDING USERS WITH INSIGHTS INTO THEIR DAY

BACKGROUND

The Internet is a global data communications system that serves billions of people across the globe and provides them access to a vast array of online information resources and services including those provided by the World Wide Web and intranet-based enterprises. Thanks to the ubiquity of the Internet and the wide variety of network-enabled end-user computing devices that exist today, people today spend a large and ever-increasing amount of time performing a wide variety of tasks online (e.g., using various types of end-user computing devices that are configured to operate over a data communication network). For example, many people today schedule their professional and personal meetings and appointments, and manage their calendars that keep track of these meetings and appointments using an electronic (e.g., computer-based and thus software-based) calendar application (also known as an online calendar). Many people today also heavily rely on electronic messages to communicate with each other in both a professional and a personal context. In other words, many people today frequently have conversations by sending electronic messages to each other over a data communication network.

SUMMARY

Insight provisioning technique implementations described herein generally provide a user with insights into their upcoming day. In one exemplary implementation one or more calendars for the user are identified. The identified calendars are then heuristically analyzed to calculate one or more insights into an upcoming day for the user, and these calculated insights are provided to the user. In another exemplary implementation one or more electronic messages each of which was received by or sent by the user are identified. The identified electronic messages are then heuristically analyzed to calculate one or more insights into an upcoming day for the user, and these calculated insights are provided to the user. In yet another exemplary implementation the identified calendars and the identified electronic messages are heuristically analyzed together to calculate one or more insights into an upcoming day for the user, and these calculated insights are provided to the user.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the insight provisioning technique implementations described herein will become better understood with regard to the following description, appended claims, and accompanying drawings where:

FIG. 9 is a flow diagram illustrating an exemplary implementation, in simplified form, of a process for heuristically analyzing identified electronic messages that were received by or sent by the user to determine if there are requests of the user that the user has not responded to.

DETAILED DESCRIPTION

Figure 1:
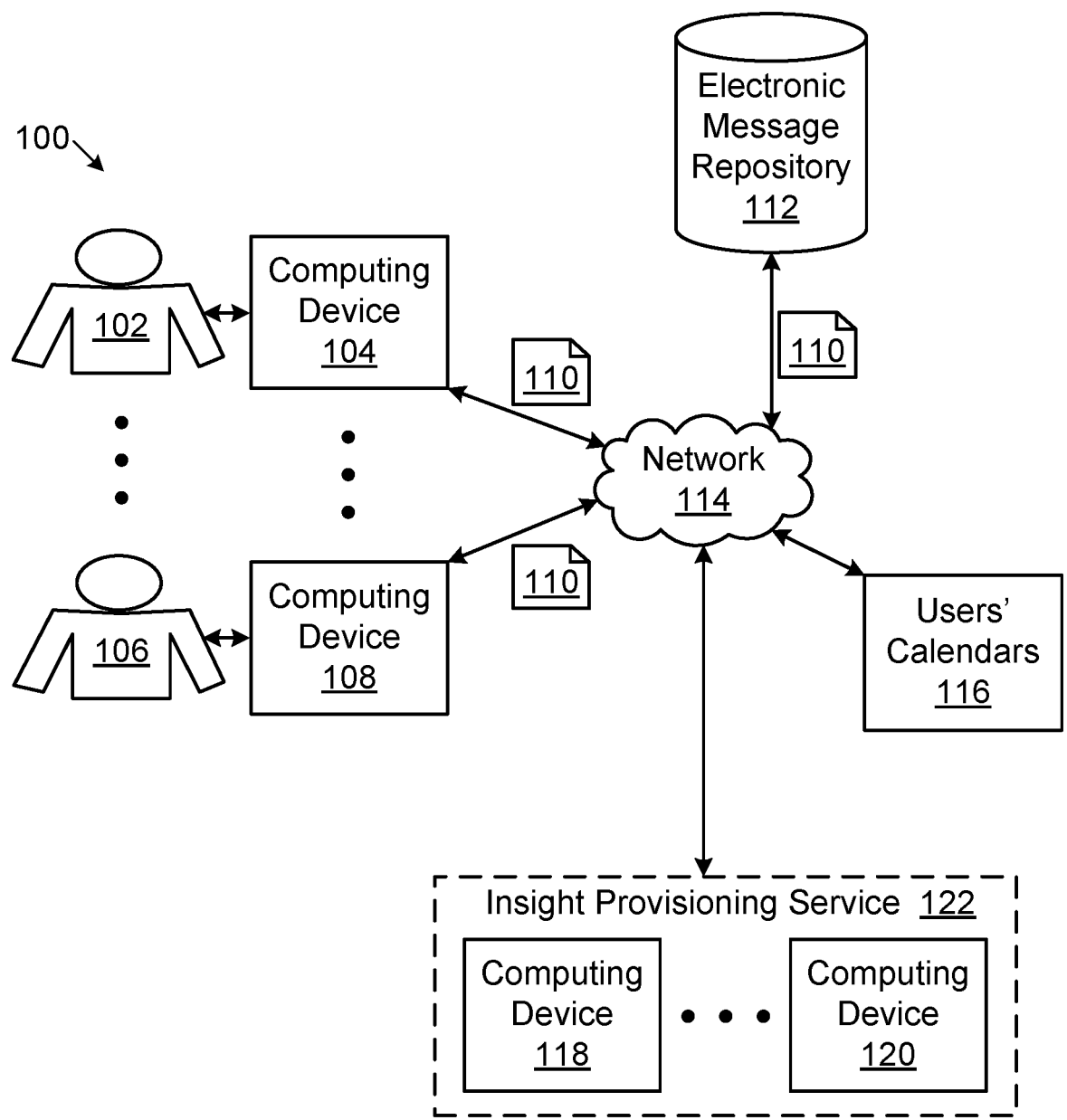
FIG. 1 is a diagram illustrating one implementation, in simplified form, of a system framework for realizing the insight provisioning technique implementations described herein.

In the following description of insight provisioning technique implementations reference is made to the accompanying drawings which form a part hereof, and in which are shown, by way of illustration, specific implementations in which the insight provisioning technique can be practiced. It is understood that other implementations can be utilized and structural changes can be made without departing from the scope of the insight provisioning technique implementations.

It is also noted that for the sake of clarity specific terminology will be resorted to in describing the insight provisioning technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version", or "one variant", or "another variant", or an "exemplary variant", or an "alternate variant" means that a particular feature, a particular structure, or particular characteristics described in connection with the implementation/version/variant can be included in at least one implementation of the insight provisioning technique. The appearances of the phrases "in one implementation", "in another implementation", "in an exemplary implementation", "in an alternate implementation", "in one version", "in another version", "in an exemplary version", "in an alternate version", "in one variant", "in another variant", "in an exemplary variant", and "in an alternate variant" in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the insight provisioning technique does not inherently indicate any particular order nor imply any limitations of the insight provisioning technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Electronic Calendaring and Messaging

As described heretofore, many people today schedule their professional and personal meetings and appointments, and manage their calendars that keep track of these meetings and appointments, using an electronic calendar application (hereafter simply referred to as a calendar application). The term "user" is used herein to refer to a person who utilizes a network-enabled end-user computing device for various tasks that are associated with the insight provisioning technique implementations described herein—examples of these tasks are described in more detail hereafter. In other words, a user is a person who is using the insight provisioning technique implementations. The term "meeting" is used herein to refer to any type of upcoming scheduled event that involves a plurality of users. In other words, a meeting is an upcoming assembly or conference of a plurality of users for a specific purpose. As such, a given meeting would generally appear in the calendars for a plurality of users. In contrast to the term "meeting," the term "appointment" is used herein to refer to any type of upcoming scheduled event that involves just a single user. As such, a given appointment would generally appear in the calendar for just a single user.

As is appreciated in the art of electronic calendaring, various conventional calendar applications exist today which vie for popularity. Many of today's calendar applications are web-based (e.g., they store people's calendar data in the cloud) and can be synchronized with each other. Today's calendar applications may also provide a variety of other features such as allowing a given person's calendar to be synchronized across each of the network-enabled end-user computing devices that they use. Today's calendar applications may also allow a given person's calendar to be shared with other people, and to be synchronized with these other people's calendars.

As also described heretofore, many people today also heavily rely on electronic messages to communicate with each other in both a professional and a personal context. In the course of this communication requests to complete tasks are often made of people. For example, Person A may receive an electronic message from Person B, where in this message Person B makes a request of Person A (e.g., Person B may ask Person A to perform a specific task). Person A may also send an electronic message to Person B, where in this message Person A makes a request of Person B (e.g., Person A may ask Person B to perform a specific task). As is appreciated in the art of electronic messaging over data communication networks, people today routinely exchange various types of electronic messages with each other including, but not limited to, email (also known as electronic mail and e-mail) messages, instant text messages (also known as SMS (Short Message Service) messages), instant multimedia messages (also known as MMS (Multimedia Messaging Service) messages), online chat messages (also known as instant messaging (IM), among other things), recorded voice messages (e.g., recorded phone calls and the like), recorded video messages (e.g., recorded video calls and the like), blog postings on the World Wide Web (herein sometimes simply referred to as the web), user postings on social networking websites, and fax (also known as facsimile or telefax) messages.

2.0 Providing Users with Insights into their Day

The insight provisioning technique implementations described herein generally provide users with valuable and pertinent insights into their upcoming day. The insight provisioning technique implementations may also provide users with valuable and pertinent insights into their upcoming week. The term "upcoming day" is used herein to refer to a new day that a user is about to begin or the user's next day. Similarly, the term "upcoming week" is used herein to refer to a new week that a user is about to begin or the user's next week. For example, in the case where the current time and date is 9:00 PM on Saturday, July 16 the upcoming day would be Sunday, July 17 and the upcoming week would be the week that begins on Monday, July 18. In the case where the current time and date is 6:00 AM on Monday, July 18 the upcoming day would be Monday, July 18 and the upcoming week would be the week that begins on Monday, July 18. The insight provisioning technique implementations can provide many different types of insights to a user, some examples of which will be described in more detail hereafter. Exemplary types of network-enabled end-user computing devices are also described in more detail hereafter.

The insight provisioning technique implementations described herein are advantageous for various reasons including, but not limited to, the following. As will be appreciated from the foregoing and the more-detailed description that follows, the insight provisioning technique implementations help users stay on top of and avoid surprises their day/week. The insight provisioning technique implementations also greatly increase users' efficiency and productivity. For example, since the insight provisioning technique implementations automatically provide a user with an at-a-glance summary (e.g., a heads up) of what to expect during their upcoming day/week, the insight provisioning technique implementations minimize the time and effort the user has to expend to optimally prepare for their upcoming day/week. In other words, the insight provisioning technique implementations eliminate the need for the user to have to manually evaluate their calendar (or calendars in the case where the user has a plurality of different calendars) and manually evaluate their electronic messages in order to prepare for their upcoming day/week. The insight provisioning technique implementations also eliminate the user being caught off guard by unexpected events, and prevent things from "slipping through the cracks." The insight provisioning technique implementations also allow the user to resolve scheduled event conflicts in advance of their occurrence. The insight provisioning technique implementations also result in users being more confident about their upcoming day/week.

FIG. 1 illustrates one implementation, in simplified form, of a system framework for realizing the insight provisioning technique implementations described herein. As exemplified in FIG. 1, the system framework 100 includes one or more end-user computing devices 104/108 each of which is utilized by one or more users 102/106 to perform various tasks that are associated with the insight provisioning technique implementations—examples of such tasks are described in more detail hereafter. Each of the end-user computing devices 104/108 can be any type of conventional mobile computing device such as a smartphone, or a tablet computer, or a laptop computer (sometimes also referred to as a notebook or netbook computer), or a computing device that is integrated into an automobile, among other types of conventional mobile computing devices. Each of the end-user computing devices 104/108 can also be any type of conventional non-mobile computing device such as a desktop personal computer (PC), or a video game console, among other types of conventional non-mobile computing devices.

Referring again to FIG. 1, each of the end-user computing devices 104/108 is configured to communicate over a conventional data communication network 114 (herein also referred to as a computer network) such as the Internet (among other types of conventional data communication networks) with an electronic message repository 112 that stores the electronic messages 110 which are communicated between the users 102/106. The insight provisioning technique implementations described herein support the communication of any type of electronic message 110 between the users 102/106. By way of example but not limitation, in one implementation of the insight provisioning technique described herein the electronic messages 110 that are communicated between the users 102/106 and stored in the repository 112 include one or more email messages which may include one or more email threads. As is appreciated in the art of email messaging, an email thread is an email message that includes a chronologically-ordered concatenation of an original email message and each of the succeeding replies thereto. Accordingly, an email thread provides a chronologically-ordered record of an email-based conversation that takes place between a plurality of users. In another implementation the electronic messages 110 may include one or more instant text messages, or one or more instant multimedia messages, or one or more online chat messages. In another implementation the messages 110 may include one or more recorded voice messages that have been converted to text using a conventional speech-to-text (also known as voice-to-text) conversion method, or one or more recorded video messages having audio that has been converted to text using the speech-to-text conversion method. In another implementation the messages 110 may include one or more web-based (e.g., online) blog postings, or one or more user postings on one or more social networking websites. In another implementation the messages 110 may include one or more fax messages that have been converted to text using a conventional optical character recognition method. In another implementation the messages 110 may include any combination of the just-described different types of electronic messages.

Referring again to FIG. 1, the system framework 100 also includes one or more calendars 116 for (e.g., belonging to) each of the users 102/106, where these calendars 116 provide information about the current availability of the users 102/106 for future scheduled events (e.g., future meetings, or appointments, or the like). Each of the users' calendars 116 is an electronic (e.g., online) calendar that is accessible via the data communication network 114 and may be located either on one of the end-user computing devices 104/108 or in the cloud. In the case where there is a plurality of different calendars 116 for a given user 102/106, each of these different calendars 116 may be associated with a different context of the user's life (e.g., the user may have one or more personal calendars, and one or more work calendars, among other types of calendars). The calendars 116 for the users 102/106 are generally managed by one or more conventional calendar applications (not shown) which may include one or more conventional personal information management applications that support electronic calendars. As described heretofore, various calendar applications exist today which vie for popularity. Many of today's calendar applications support a conventional open protocol that can be used to access the users' calendars 116 via the network 114.

Referring again to FIG. 1, the end-user computing devices 104/108 are utilized by the users 102/106 to perform a wide variety of tasks. By way of example but not limitation, the users 102/106 may utilize the computing devices 104/108 to schedule various events such as their professional and personal meetings and appointments. The users 102/106 may also utilize the computing devices 104/108 to manage their calendars that keep track of these scheduled events. The users 102/106 may also utilize the computing devices 104/108 to send electronic messages to and receive electronic messages from other users and other people who may not be using the insight provisioning technique implementations described herein. The users 102/106 may also utilize the computing devices 104/108 to receive insights into their upcoming day/week.

Referring again to FIG. 1, the end-user computing devices 104/108, the electronic message repository 112, and the user's calendars 116 are also configured to communicate over the data communication network 114 with an insight provisioning service 122 that runs on one or more other computing devices 118/120. These other computing devices 118/120 can also communicate with each other via the network 114. In an exemplary implementation of the insight provisioning technique described herein the other computing devices 118/120 are located in the cloud so that the insight provisioning service 122 operates as a cloud service and the network 114 includes wide area network functionality. The term "cloud service" is used herein to refer to a web application that operates in the cloud and can be hosted on (e.g., deployed at) a plurality of data centers that can be located in different geographic regions (e.g., different regions of the world). In this particular implementation the insight provisioning service 122 may interact with an insight provisioning application (not shown) that may run on each of the end-user computing devices 104/108.

Referring again to FIG. 1 and as will be described in more detail hereafter, the insight provisioning service 122 generally performs a variety of functions associated with providing insights to each of the users 102/106. By way of example but not limitation, in one implementation of the insight provisioning technique described herein the insight provisioning service 122 identifies one or more calendars for a given user, then heuristically analyzes (e.g., uses a heuristic method/procedure to analyze) these identified calendars to calculate (e.g., derive) one or more insights into the user's upcoming day/week, and then provides these insights to the user. In another implementation of the insight provisioning technique the insight provisioning service 122 identifies one or more electronic messages each of which was received by or sent by the user, then heuristically analyzes these identified electronic messages to calculate one or more insights into the user's upcoming day/week, and then provides these insights to the user. In yet another implementation of the insight provisioning technique the insight provisioning service 122 heuristically analyzes both the identified calendars and the identified electronic messages to calculate one or more insights into the user's upcoming day/week, and then provides these insights to the user. Exemplary types of insights into the user's upcoming day/week that may be calculated from the just-described heuristic analyses will be described in more detail hereafter.

Figure 2:
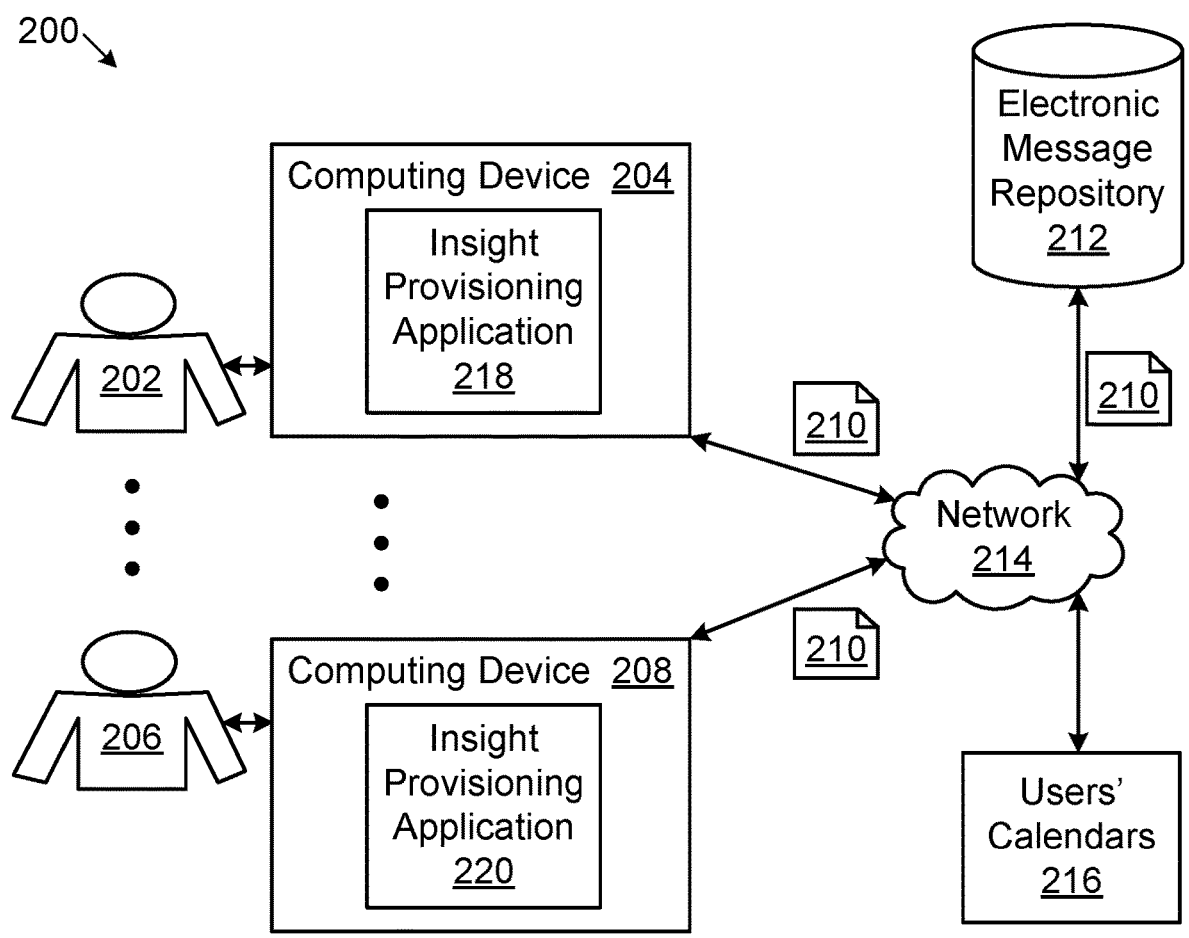
FIG. 2 is a diagram illustrating another implementation, in simplified form, of a system framework for realizing the insight provisioning technique implementations described herein.

FIG. 2 illustrates another implementation, in simplified form, of a system framework for realizing the insight provisioning technique implementations described herein. As exemplified in FIG. 2, the system framework 200 includes the aforementioned end-user computing devices 204/208 that are utilized by the aforementioned users 202/206 to perform the various tasks described herein that are associated with the insight provisioning technique implementations. The computing devices 204/208 are configured to communicate over the aforementioned data communication network 214 with the aforementioned electronic message repository 212 that stores the aforementioned electronic messages 210 which are communicated between the users 202/206, and with the aforementioned calendars 216 for each of the users. The system framework 200 also includes an insight provisioning application 218/220 that runs on each of the computing devices 204/208 and performs the various functions described herein that are associated with providing insights to the user 202/206 of the computing device 204/208.

Figure 3:
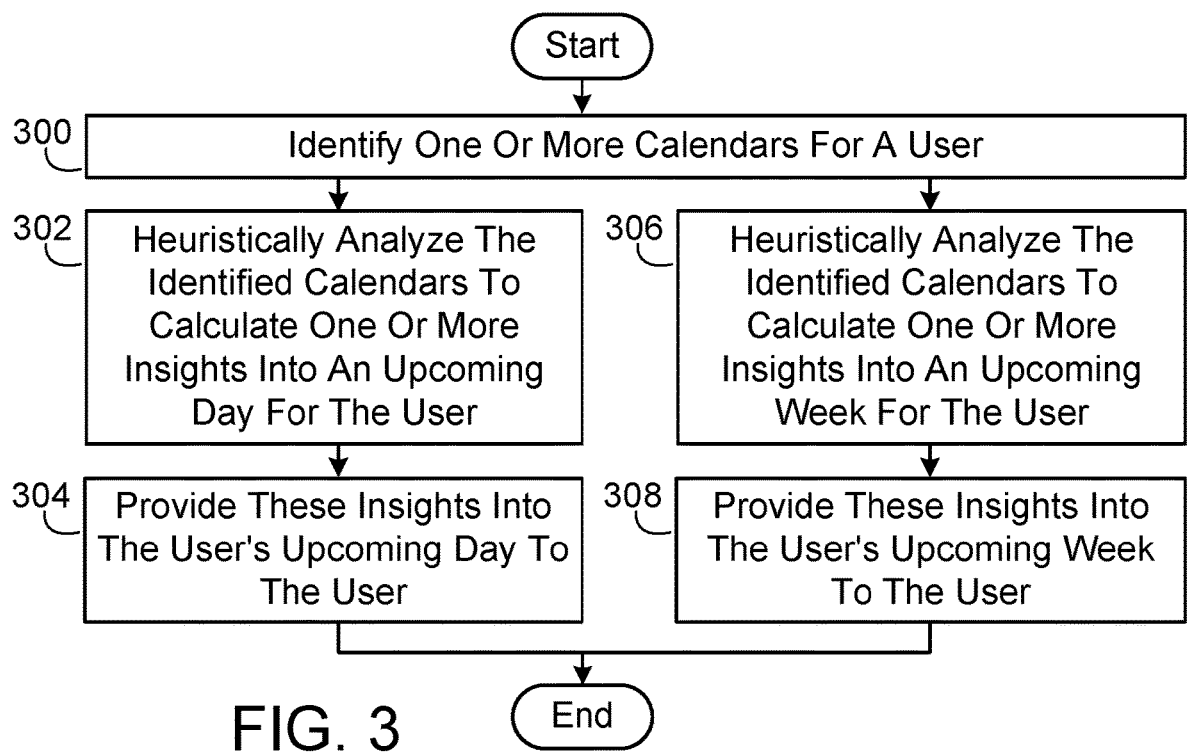
FIG. 3 is a flow diagram illustrating one implementation, in simplified form, of a process for providing insights to a user.

FIG. 3 illustrates one implementation, in simplified form, of a process for providing insights to a user. In an exemplary implementation of the insight provisioning technique described herein the process illustrated in FIG. 3 is realized on the system framework 100 illustrated in FIG. 1. As exemplified in FIG. 3, the process starts with identifying one or more calendars for the user (process action 300). It will be appreciated that the calendar identification of action 300 can be performed in various ways. For example, in an exemplary implementation of the insight provisioning technique described herein one or more calendars for the user are identified using a profile for the user that exists in a calendar application that is utilized by the user. After the calendars for the user have been identified (action 300), these identified calendars are heuristically analyzed to calculate one or more insights into an upcoming day for the user (herein also referred to as the user's upcoming day) (process action 302). These insights into the user's upcoming day are then provided to the user (process action 304). Exemplary methods for providing the insights into the user's upcoming day to the user are described in more detail hereafter. Given the foregoing and the more-detailed description that follows, it will be appreciated that the combination of actions 302 and 304 has the advantageous effect of increasing the efficiency and productivity of the user.

It will also be appreciated that in the case where the identified calendars for the user include a plurality of different calendars for the user, these different calendars for the user can be managed in various ways. For example, in one implementation of the insight provisioning technique described herein the different calendars for the user may be managed by a common calendar application that is accessible via the computer network. In another implementation of the insight provisioning technique one or more of the different calendars for the user may be managed by one calendar application that is accessible via the computer network and the others of the different calendars for the user may be managed by one or more other calendar applications that are also accessible via the computer network.

Referring again to FIG. 3, the heuristic analysis of action 302 can calculate many different types of insights into the user's upcoming day, some examples of which will now be described in more detail. In one implementation of the insight provisioning technique described herein the insights that are calculated in action 302 include the user being scheduled to meet with one or more atypical people during the user's upcoming day—this particular implementation is hereafter simply referred to as the atypical people implementation. The term "atypical person" is used herein to refer to a person whom the user has not met with (e.g., not had a scheduled event with) in the past prescribed number of days. In a tested version of the atypical people implementation this prescribed number of days was 30 days. Other versions of the atypical people implementation are also possible where this prescribed number of days is either less than or greater than 30 days. As such, an atypical person may be someone who the user has never met before. Once action 302 has determined that the user is scheduled to meet with one or more atypical people during the user's upcoming day, the atypical people implementation may utilize various available online resources to determine various types of information related to each of the atypical people such as a photograph of the atypical person, or the atypical person's name, or a title that is associated with the atypical person, or an office location that is associated with the atypical person, or the like. One example of an available online resource that may be utilized to determine this information related to a given atypical person is one or more profiles for this person that may be accessible via the computer network. Accordingly, the insights provisioning of action 304 can provide the user with each of the just-described types of information related to each of the atypical people the user is scheduled to meet with during their upcoming day, and can also provide the user with a count of these atypical people. It will be appreciated that the atypical people implementation advantageously increases the user's efficiency and productivity by automatically letting the user know ahead of time that they'll be meeting with one or more atypical people during their upcoming day (as such, the user does not have to spend their time manually evaluating each of their calendars each day in an attempt to remember if they've previously met with each of the people that they'll be meeting with during their upcoming day). The user is thus able to spend some time learning more about these atypical people before the meeting so that they don't get caught by surprise in the meeting.

In another implementation of the insight provisioning technique described herein the insights that are calculated in action 302 of FIG. 3 include the user being scheduled for an event that will take place in one or more atypical locations during the user's upcoming day—this particular implementation is hereafter simply referred to as the atypical locations implementation. The term "atypical location" is used herein to refer to a location for a scheduled event that either is outside of the building in which the user is currently located, or is in a building where the user has not had a scheduled event in the past prescribed number of days (e.g., a location for a scheduled event that is different than the user's typical scheduled event locations). In a tested version of the atypical locations implementation this prescribed number of days was 30 days. Other versions of the atypical locations implementation are also possible where this prescribed number of days is either less than or greater than 30 days. As such, an atypical location may be a location where the user has never been before. Once action 302 has determined that the user is scheduled for an event that will take place in one or more atypical locations during the user's upcoming day, the atypical locations implementation may utilize various available online resources to determine various types of information related to each of the atypical locations such as a map of where the atypical location is situated, or a street address associated with the atypical location, or a building number and/or room number associated with the atypical location, or an amount of time it is expected to take for the user to travel from their current location to the atypical location, or a suggested route for the user to take during this travel, or the like. Examples of available online resources that may be utilized to determine this information related to a given atypical location include, but are not limited to, the identified calendars for the user, and various map and traffic conditions reporting websites. Accordingly, the insights provisioning of action 304 can provide the user with each of the just-described types of information related to each of the atypical locations the user is scheduled for during their upcoming day, and can also provide the user with a count of these atypical locations. It will be appreciated that the atypical locations implementation advantageously increases the user's efficiency and productivity by automatically letting them know ahead of time if they're scheduled for any events during their upcoming day that will take place in an atypical location (as such, the user does not have to spend their time manually evaluating each of their calendars each day in order to figure out where each of their scheduled events during their upcoming day is located, and figure out if they'll need to travel to any of these events, and figure out how much time to allow for this travel and which route to take). The user is thus able to insure that they make it to each of their scheduled events on time.

In another implementation of the insight provisioning technique described herein the insights that are calculated in action 302 of FIG. 3 include an amount of time it is expected to take for the user to commute from home to work or from work to home. This particular implementation may utilize various available online resources to determine these expected commute times such as various map and traffic conditions reporting websites, or the like.

In another implementation of the insight provisioning technique described herein the insights that are calculated in action 302 of FIG. 3 include the user's upcoming day being a busy day—this particular implementation is hereafter simply referred to as the busy day implementation. The term "busy day" is herein defined as follows. In the case where the user's upcoming day is a Monday, the term "busy day" is used herein to refer to the fact that the user has significantly more events scheduled in their calendars on this particular Monday than on the average Monday. As such, and as will be appreciated from the more-detailed description of the busy day implementation that follows, the term "busy day" is specific to a given day of the week. It will be appreciated that the busy day implementation advantageously increases the user's efficiency and productivity by automatically letting them know ahead of time if their upcoming day is going to be an especially busy day (as such, the user does not have to spend their time manually evaluating each of their calendars each day in order to determine how many scheduled events they have in their upcoming day and then decide how this compares to their typical day). The user is thus able to plan accordingly for their upcoming day. For example, they may want to make sure they eat breakfast before beginning their day, or pack a lunch before they leave the house. They may also want to try to identify any low-priority events that are currently scheduled for their upcoming day and then move these low-priority events to a different day that is less busy.

Figure 4:
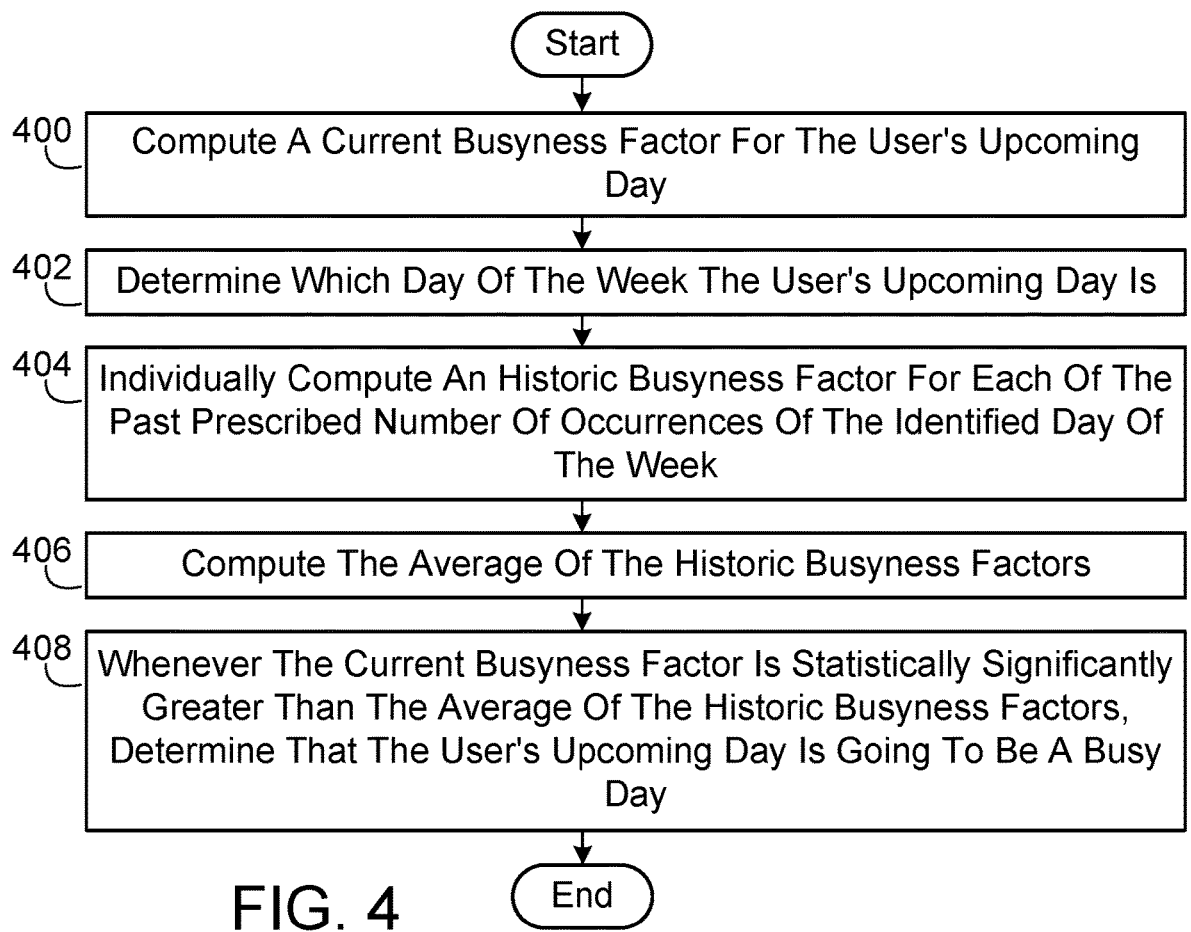
FIG. 4 is a flow diagram illustrating an exemplary implementation, in simplified form, of a process for heuristically analyzing identified calendars for the user to determine if the user's upcoming day is going to be a busy day.

FIG. 4 illustrates an exemplary implementation, in simplified form, of a process for heuristically analyzing the identified calendars for the user to determine if the user's upcoming day is going to be a busy day. As exemplified in FIG. 4, the process starts with computing a current busyness factor for the user's upcoming day (process action 400). In an exemplary implementation of the insight provisioning technique described herein the current busyness factor is the percentage of time in the user's upcoming day that the user has events scheduled in an aggregation of the identified calendars for the user. A determination is then made regarding which day of the week the user's upcoming day is (process action 402)—e.g., it is determined whether the user's upcoming day is a Monday, or a Tuesday, or a Wednesday, or a Thursday, or a Friday, or a Saturday, or a Sunday. An historic busyness factor is then individually computed for each of the past prescribed number of occurrences of the identified day of the week (process action 404). In an exemplary implementation of the insight provisioning technique the historic busyness factor is the percentage of time in a particular past day that the user has events scheduled in the aggregation of the identified calendars for the user. In a tested version of the process illustrated in FIG. 4, the prescribed number of occurrences was 4 occurrences.

Other versions of the busy day implementation are also possible where the prescribed number of occurrences is either less than or greater than 4 occurrences. After the historic busyness factor has been individually computed for each of the past prescribed number of occurrences of the identified day of the week (action 404), the average of these historic busyness factors is then computed (process action 406). Then, whenever the current busyness factor is statistically significantly greater than the average of the historic busyness factors (e.g., the current busyness factor has a value that is greater than a prescribed busyness number (e.g., one, or two, among other numbers) plus the standard deviation of the historic busyness factors), it is determined that the user's upcoming day is going to be a busy day (process action 408).

In another implementation of the insight provisioning technique described herein the insights that are calculated in action 302 of FIG. 3 include the user's upcoming day being a light day—this particular implementation is hereafter simply referred to as the light day implementation. The term "light day" is herein defined as follows. In the case where the user's upcoming day is a Monday, the term "light day" is used herein to refer to the fact that the user has significantly fewer events scheduled in an aggregation of the identified calendars for the user on this particular Monday than on the average Monday. As such, and as will be appreciated from the more-detailed description of the busy day implementation that follows, the term "light day" is also specific to a given day of the week. It will be appreciated that the light day implementation advantageously increases the user's efficiency and productivity by automatically letting them know ahead of time if their upcoming day is going to be an especially light day (as such, the user does not have to spend their time manually evaluating each of their calendars each day in order to determine how many scheduled events they have in their upcoming day and then decide how this compares to their typical day). The user is thus able to plan accordingly for their upcoming day. For example, they may want to plan to spend some extra time with family or friends, or get some exercise.

Figure 5:
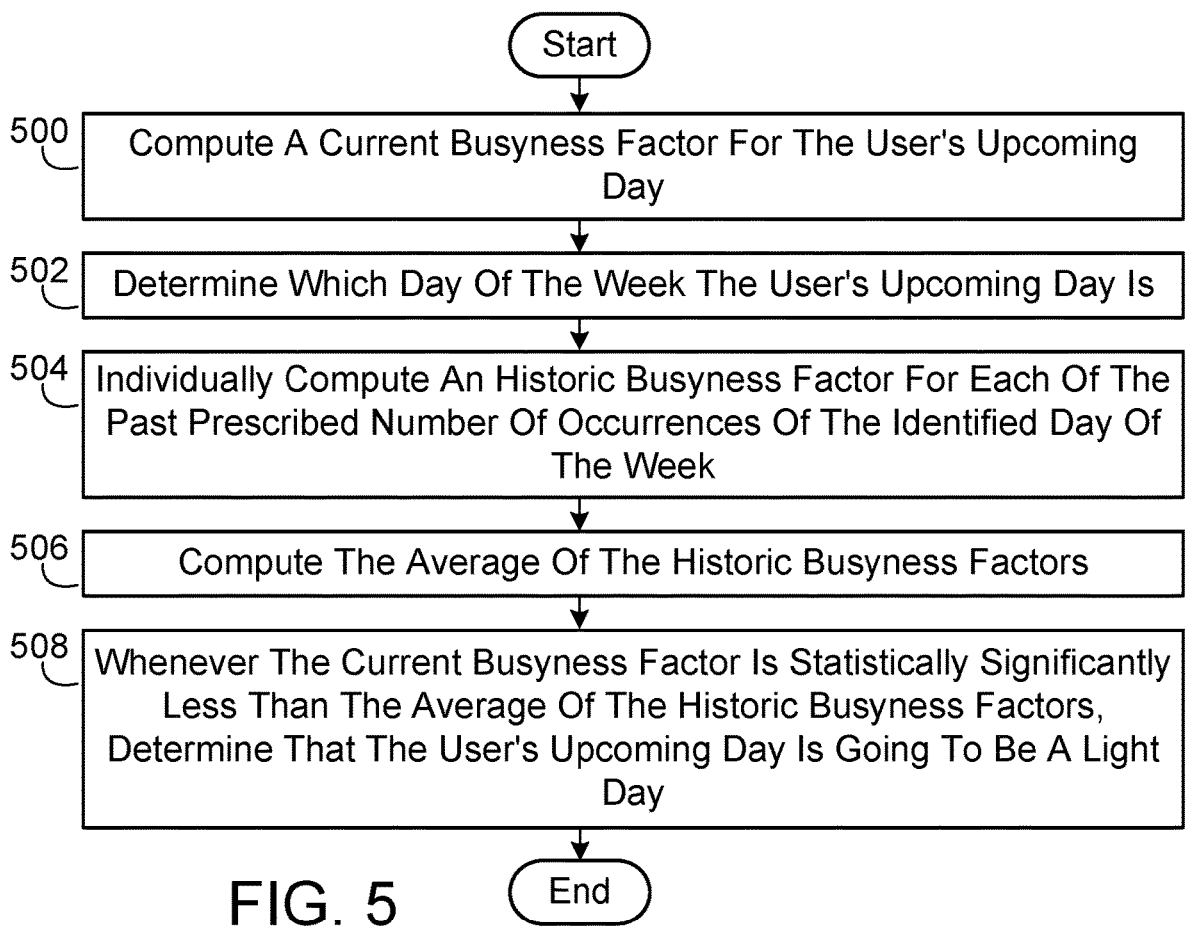
FIG. 5 is a flow diagram illustrating an exemplary implementation, in simplified form, of a process for heuristically analyzing identified calendars for the user to determine if the user's upcoming day is going to be a light day.

FIG. 5 illustrates an exemplary implementation, in simplified form, of a process for heuristically analyzing the identified calendars for the user to determine if the user's upcoming day is going to be a light day. As exemplified in FIG. 5, the process starts with computing the aforementioned current busyness factor for the user's upcoming day (process action 500). A determination is then made regarding which day of the week the user's upcoming day is (process action 502). The aforementioned historic busyness factor is then individually computed for each of the aforementioned past prescribed number of occurrences of the identified day of the week (process action 504), and the average of these historic busyness factors is computed (process action 506). Then, whenever the current busyness factor is statistically significantly less than the average of the historic busyness factors (e.g., the current busyness factor has a value that is less than the aforementioned prescribed busyness number minus the standard deviation of the historic busyness factors), it is determined that the user's upcoming day is going to be a light day (process action 508).

In another implementation of the insight provisioning technique described herein the insights that are calculated in action 302 of FIG. 3 include the user having no time for lunch in their upcoming day—this particular implementation is hereafter simply referred to as the no time for lunch implementation. It will be appreciated that the no time for lunch implementation advantageously increases the user's efficiency and productivity by automatically letting the user know ahead of time that they won't have time to eat lunch during their upcoming day (as such, the user does not have to spend their time manually evaluating each of their calendars each day in order to determine that they won't have time to eat lunch during their upcoming day). The no time for lunch implementation can also positively affect the user's health and well being by allowing them to plan accordingly for their upcoming day. For example, they may want to make sure they eat a big breakfast before beginning their day, or pack a lunch before they leave the house, or pick up a to-go lunch early and bring it to a scheduled event that occurs during lunch. They may also want to try to identify any low-priority events that are currently scheduled during lunch for their upcoming day and reschedule these low-priority events.

Figure 6:
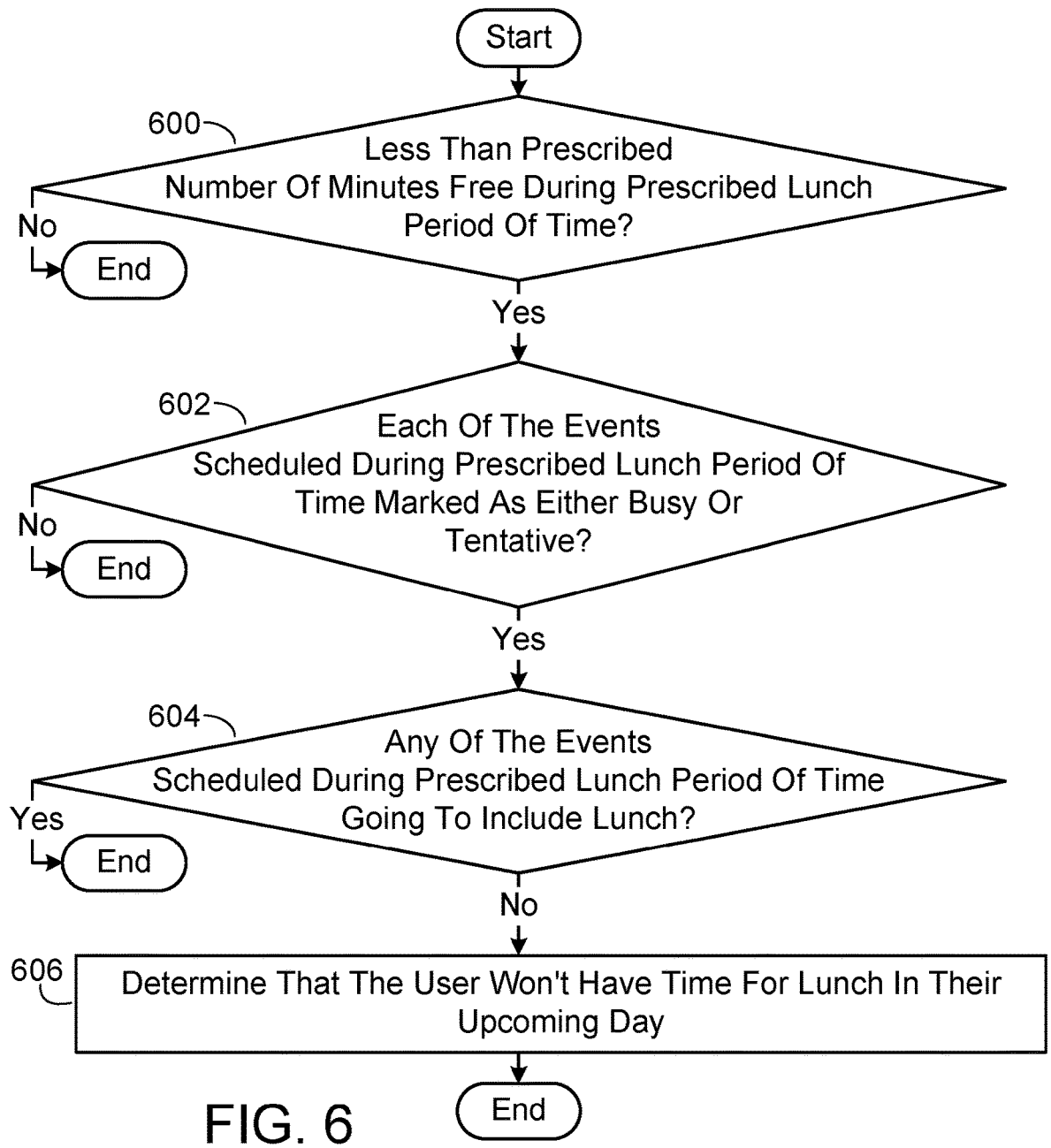
FIG. 6 is a flow diagram illustrating an exemplary implementation, in simplified form, of a process for heuristically analyzing identified calendars for the user to determine if the user will have time for lunch in their upcoming day.

FIG. 6 illustrates an exemplary implementation, in simplified form, of a process for heuristically analyzing the identified calendars for the user to determine if the user will have time for lunch in their upcoming day. As exemplified in FIG. 6, the process starts with analyzing an aggregation of the identified calendars for the user to determine if there is less than a prescribed number of minutes free during a prescribed lunch period of time in this calendars aggregation (process action 600). In a tested version of the process illustrated in FIG. 6, the prescribed lunch period of time was between 11:00 AM and 2:00 PM and the prescribed number of minutes was 15 minutes. Other versions of the no time for lunch implementation are also possible where the lunch period of time is a different period of time and the prescribed number of minutes is either less than or greater than 15 minutes. Whenever there is less than the prescribed number of minutes free during the prescribed lunch period of time in the aggregation of the identified calendars for the user (action 600, Yes), the identified calendars for the user are analyzed to determine if each of the events that is scheduled to occur during the prescribed lunch period of time is marked as either "busy" (e.g., the user plans to attend the event) or "tentative" (e.g., the user is still deciding whether or not they will attend the event) (process action 602). Then, whenever each of the events that is scheduled to occur during the prescribed lunch period of time in the identified calendars for the user is marked as either "busy" or "tentative" (action 602, Yes), the identified calendars for the user are again analyzed to determine if any of the events that is scheduled to occur during the prescribed lunch period of time is going to be an event that will include lunch (e.g., ether a scheduled event during which lunch will be brought in, or a scheduled event that will take place at a restaurant, or the like) (process action 604). It will be appreciated that the determination of action 604 can be made in various ways such as parsing the subject/title of each of the events that is scheduled to occur during the prescribed lunch period of time and looking for the word "lunch" (e.g., "Lunch with Jim", or "Lunch Meeting to Discuss Budget"), among other ways. Whenever none of the events that is scheduled to occur during the prescribed lunch period of time is going to be an event that will include lunch (action 604, No), it is determined that the user won't have time for lunch in their upcoming day (process action 606).

In another implementation of the insight provisioning technique described herein the insights that are calculated in action 302 of FIG. 3 include the user having a scheduled event conflict in their upcoming day—this particular implementation is hereafter simply referred to as the scheduled event conflict implementation. The term "scheduled event conflict" is used herein to refer to a situation where there are two or more events that are scheduled to occur either during a common period of time (e.g., either these events are scheduled to occur at the same time, or they overlap in time with each other), or back-to-back (e.g., one immediately following the other) in different locations, where each of these events is marked as either "busy" or "tentative" in the identified calendars. Once action 302 has determined that the user has a scheduled event conflict in their upcoming day, the scheduled event conflict implementation may heuristically analyze the details of each of the scheduled events that is involved in the conflict to determine a one or more recommended actions for the user to take in order to resolve this conflict, and may then provide these recommended actions to the user. As will be described in more detail hereafter, each of the recommended actions is specifically tailored to the meaningfulness to the user of each of the scheduled events that is involved in the conflict and how difficult it will be to reschedule each of these events. It will be appreciated that the scheduled event conflict implementation advantageously increases the user's efficiency and productivity by automatically letting the user know ahead of time that they have either a meeting or appointment conflict in their upcoming day (as such, the user does not have to spend their time manually evaluating each of their calendars each day in an attempt to figure out if any meeting or appointment conflicts exist during their upcoming day).

Figure 7:
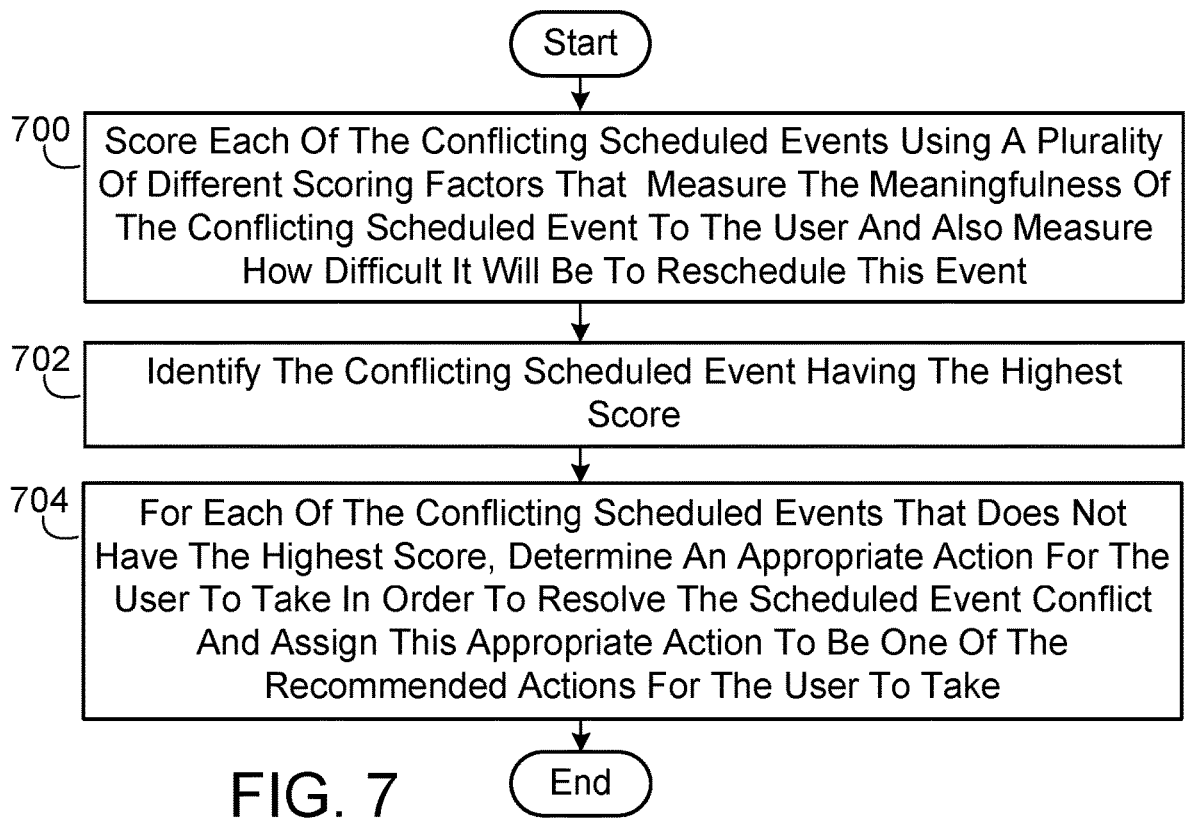
FIG. 7 is a flow diagram illustrating an exemplary implementation, in simplified form, of a process for heuristically analyzing the details of each scheduled event that is involved in a scheduled event conflict in the identified calendars for the user to determine one or more recommended actions for the user to take in order to resolve this conflict.

FIG. 7 illustrates an exemplary implementation, in simplified form, of a process for heuristically analyzing the details of each of the scheduled events that is involved in a given scheduled event conflict that the user has their upcoming day to determine one or more recommended actions for the user to take in order to resolve this conflict. For simplicity sake, each of the scheduled events that is involved in the scheduled event conflict will hereafter be referred to as a conflicting scheduled event. As exemplified in FIG. 7, the process starts with scoring each of the conflicting scheduled events using a plurality of different scoring factors that measure the meaningfulness of the conflicting scheduled event to the user and also measure how difficult it will be to reschedule this event (process action 700). Generally speaking and as will be appreciated from the more-detailed description of this scoring action 700 that follows, the higher the score for a given conflicting scheduled event is, the more meaningful (e.g., relevant) the event is to the user and the more difficult it will be to reschedule the event. Accordingly, the higher the score for a given conflicting scheduled event is, the lower the likelihood that the user will want to reschedule or decline the event. Conversely, the lower the score for a given conflicting scheduled event is, the less meaningful the event is to the user and the less difficult it will be to reschedule the event. Accordingly, the lower the score for a given conflicting scheduled event is, the higher the likelihood that the user will want to reschedule or decline the event. After the just-described scoring (action 700) has been completed, the conflicting scheduled event having the highest score is identified (process action 702). Then, for each of the conflicting scheduled events that does not have the highest score, an appropriate action for the user to take in order to resolve the scheduled event conflict that the user has in their upcoming day is determined, and this appropriate action is assigned to be one of the aforementioned recommended actions for the user to take (process action 704).

Referring again to FIG. 7, the scoring of each of the conflicting scheduled events (action 700) can be implemented in various ways. In an exemplary implementation of the insight provisioning technique described herein each of the conflicting scheduled events is scored as follows. The score for the conflicting scheduled event is first initialized to zero. Then, whenever the identified calendars for the user indicate that the user is the organizer of the conflicting scheduled event, 40 points are added to its score. Whenever the identified calendars for the user indicate that the user has accepted the conflicting scheduled event and it is a recurring event, 20 points are added to its score. Whenever the identified calendars for the user indicate that the user has accepted the conflicting scheduled event and it is a non-recurring event, 10 points are added to its score. Whenever the identified calendars for the user indicate that the user has neither accepted nor declined the conflicting scheduled event and it is a non-recurring event, 25 points are added to its score. Whenever the identified calendars for the user indicate that the user has neither accepted nor declined the conflicting scheduled event and it is a recurring event, 15 points are added to its score. Whenever the conflicting scheduled event is marked as "free" in the identified calendars for the user, 1 point is added to its score. Whenever the identified calendars for the user indicate that the user is a required attendee for the conflicting scheduled event, 20 points are added to its score. Whenever the identified calendars for the user indicate that the user is an optional attendee for the conflicting scheduled event, 1 point is added to its score. Whenever the identified calendars for the user indicate that the conflicting scheduled event is an appointment, 20 points are added to its score. Whenever the identified calendars for the user indicate that the event is not an appointment (rather it's a meeting), 5 points are added to its score. Whenever the conflicting scheduled event is marked as "urgent" in the identified calendars for the user, 20 points are added to its score. Whenever the conflicting scheduled event is not marked as "urgent" in the identified calendars for the user, 5 points are added to its score. Whenever the identified calendars for the user indicate that the conflicting scheduled event duration is less than or equal to 4 hours, 20 points are added to its score. Whenever the identified calendars for the user indicate that the conflicting scheduled event duration is greater than 4 hours, 5 points are added to its score. Whenever the identified calendars for the user indicate that the request to attend the conflicting scheduled event was sent from the user's manager or someone who the user's manager reports to, 20 points are added to its score. Whenever the identified calendars for the user indicate that the request to attend the conflicting scheduled event was sent from a person who the user has frequently met with the in the past, 15 points are added to its score. Whenever the identified calendars for the user indicate that the request to attend the conflicting scheduled event was sent from a person who is not a member of the user's organization (e.g., the user's company/employer, among other types of organizations), 10 points are added to its score. Whenever the identified calendars for the user indicate that the request to attend the conflicting scheduled event was sent from someone other than the user's manager or someone who the user's manager reports to, or a person who the user has frequently met with the in the past, or a person who is not a member of the user's organization, 5 points are added to its score. Whenever the identified calendars for the user indicate that the request to attend the conflicting scheduled event was sent to the user as an explicit attendee and the attendee count is less than or equal to 10, 20 points are added to its score. Whenever the identified calendars for the user indicate that the request to attend the conflicting scheduled event was sent to the user as an explicit attendee and the attendee count is greater than 10, 10 points are added to its score. Whenever the identified calendars for the user indicate that the request to attend the conflicting scheduled event was sent to a distribution list that includes the user and the size of this list is less than or equal to 15 people, 20 points are added to its score. Whenever the identified calendars for the user indicate that the request to attend the conflicting scheduled event was sent to a distribution list that includes the user and the size of this list is greater than 15 people, 5 points are added to its score.

Referring again to FIG. 7, the appropriate action determination of action 704 can be implemented in various ways. In an exemplary implementation of the insight provisioning technique described herein an appropriate action for the user to take for a given conflicting scheduled event in order to resolve the scheduled event conflict is determined as follows. Whenever the identified calendars for the user indicate that the user is the organizer for the conflicting scheduled event, it is determined that the appropriate action is to reschedule the conflicting scheduled event. Whenever the identified calendars for the user indicate that the user is just an attendee for the conflicting scheduled event and it is marked as "free" (as opposed to being marked as "busy"), it is determined that the appropriate action is to decline the conflicting scheduled event. Whenever the identified calendars for the user indicate that the user is an optional attendee for the conflicting scheduled event, it is determined that the appropriate action is to decline the conflicting scheduled event. Whenever the identified calendars for the user indicate that the user is an explicit attendee for the conflicting scheduled event (e.g. the user is not part of a distribution list) and the attendee count for the conflicting scheduled event is greater than 10, it is determined that the appropriate action is to decline the conflicting scheduled event. Whenever the identified calendars for the user indicate that the user is an explicit attendee for the conflicting scheduled event and the attendee count for the conflicting scheduled event is less than or equal to 10, it is determined that the appropriate action is to propose a new time for the conflicting scheduled event to the user. Whenever the identified calendars for the user indicate that the user is just an attendee for the conflicting scheduled event and is included in a distribution list having a size of greater than 10 people, it is determined that the appropriate action is to decline the conflicting scheduled event. Whenever the identified calendars for the user indicate that the user is just an attendee for the conflicting scheduled event and is included in a distribution list having a size of less than or equal to 10 people, it is determined that the appropriate action is to propose a new time for the conflicting scheduled event to the user.

In another implementation of the insight provisioning technique described herein the insights that are calculated in action 302 of FIG. 3 include there being schedule changes for one or more events that are scheduled to occur during the user's upcoming day—this particular implementation is hereafter simply referred to as the schedule changes implementation. Once action 302 has determined that there are schedule changes for one or more events that are scheduled to occur during the user's upcoming day, the schedule changes implementation may utilize the identified calendars for the user to determine various types of information related to each of these schedule changes such as a title associated with each of the events whose schedule has changed, or the details of the schedule change for each of these events, or a count of these events, or the like. Accordingly, the insights provisioning of action 304 can provide the user with each of the just-described types of information related to each of the schedule changes. It will be appreciated that the schedule changes implementation advantageously increases the user's efficiency and productivity by automatically letting the user know ahead of time that there are schedule changes for one or more events that are scheduled to occur during their upcoming day (as such, the user does not have to spend their time manually evaluating each of their calendars in order to determine that that are schedule changes for one or more events that are scheduled to occur during their upcoming day, and the details of these changes).

Referring again to FIG. 3, in addition to calculating insights into the upcoming day for the user (action 302), the insight provisioning technique described herein may also heuristically analyze the identified calendars for the user to calculate one or more insights into an upcoming week for the user (herein also referred to as the user's upcoming week) (process action 306). These insights into the user's upcoming week may then be provided to the user (process action 308). It will be appreciated that the aforementioned different types of insights into the user's upcoming day can generally be extended to cover the user's upcoming week. By way of example but not limitation, the insights that are calculated in action 306 may include the user being scheduled to meet with one or more atypical people during the user's upcoming week, or the user being scheduled for an event that will take place in one or more atypical locations during the user's upcoming week. The insights that are calculated in action 306 may also include the user's upcoming week being either a busy week or a light week. The insights that are calculated in action 306 may also include the user having a scheduled event conflict in their upcoming week, or there being schedule changes for one or more events that are scheduled during the user's upcoming week.

Figure 8:
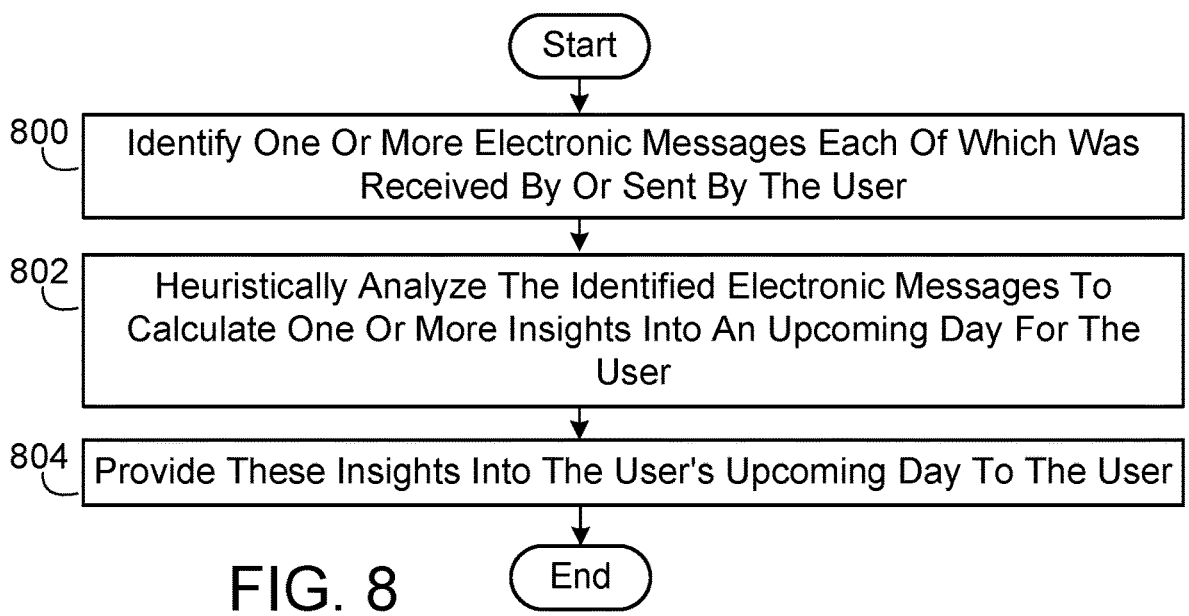
FIG. 8 is a flow diagram illustrating another implementation, in simplified form, of a process for providing insights to a user.

FIG. 8 illustrates another implementation, in simplified form, of a process for providing insights to a user. In an exemplary implementation of the insight provisioning technique described herein the process illustrated in FIG. 8 is realized on the system framework 100 illustrated in FIG. 1. As exemplified in FIG. 8, the process starts with identifying one or more electronic messages each of which was received by or sent by the user (process action 800). Exemplary types of electronic messages that can be identified have been described heretofore. In a tested implementation of the insight provisioning technique the electronic messages that were identified in action 800 were email messages stored in the "Inbox" folder and/or the "Sent Items" folder of a conventional email application that was utilized by the user. After the electronic messages that were received by or sent by the user have been identified (action 800), the identified electronic messages that were received by or sent by the user are heuristically analyzed to calculate one or more insights into an upcoming day for the user (process action 802). These insights into the user's upcoming day are then provided to the user (process action 804). Exemplary methods for providing the insights into the user's upcoming day to the user are described in more detail hereafter. Given the foregoing and the more-detailed description that follows, it will be appreciated that the combination of actions 802 and 804 has the advantageous effect of increasing the efficiency and productivity of the user.

Referring again to FIG. 8, the heuristic analysis of action 802 can calculate many different types of insights into the user's upcoming day, some examples of which will now be described in more detail. In one implementation of the insight provisioning technique described herein the insights that are calculated in action 802 include there being one or more requests of the user that the user has not responded to—this particular implementation is hereafter simply referred to as the requests of the user awaiting a response implementation. It is noted that each of these requests may be any type of task or action that another person has asked the user to perform. Once action 802 has determined that there are one or more requests of the user that the user has not responded to, the requests of the user awaiting a response implementation may utilize the identified electronic messages that were received by or sent by the user to determine various types of information related to each of these requests of the user such as an identifier of the person (e.g., a name, or an email address, or the like) who made each of the requests of the user, or a description of each of these requests, or the like. Accordingly, the insights provisioning of action 804 can provide the user with each of the just-described types of information related to each of the requests of the user that the user has not responded to. As will be appreciated from the more-detailed description of the requests of the user awaiting a response implementation that follows, this implementation advantageously increases the user's efficiency and productivity by automatically letting the user know ahead of time that they have not yet responded to people who have made requests of the user (as such, the user does not have to spend their time manually checking each of the electronic messages they received in an attempt to identify such requests that are still awaiting their response). The user is thus reminded to follow-up with each of the people who made one or more requests of the user.

Figure 9:
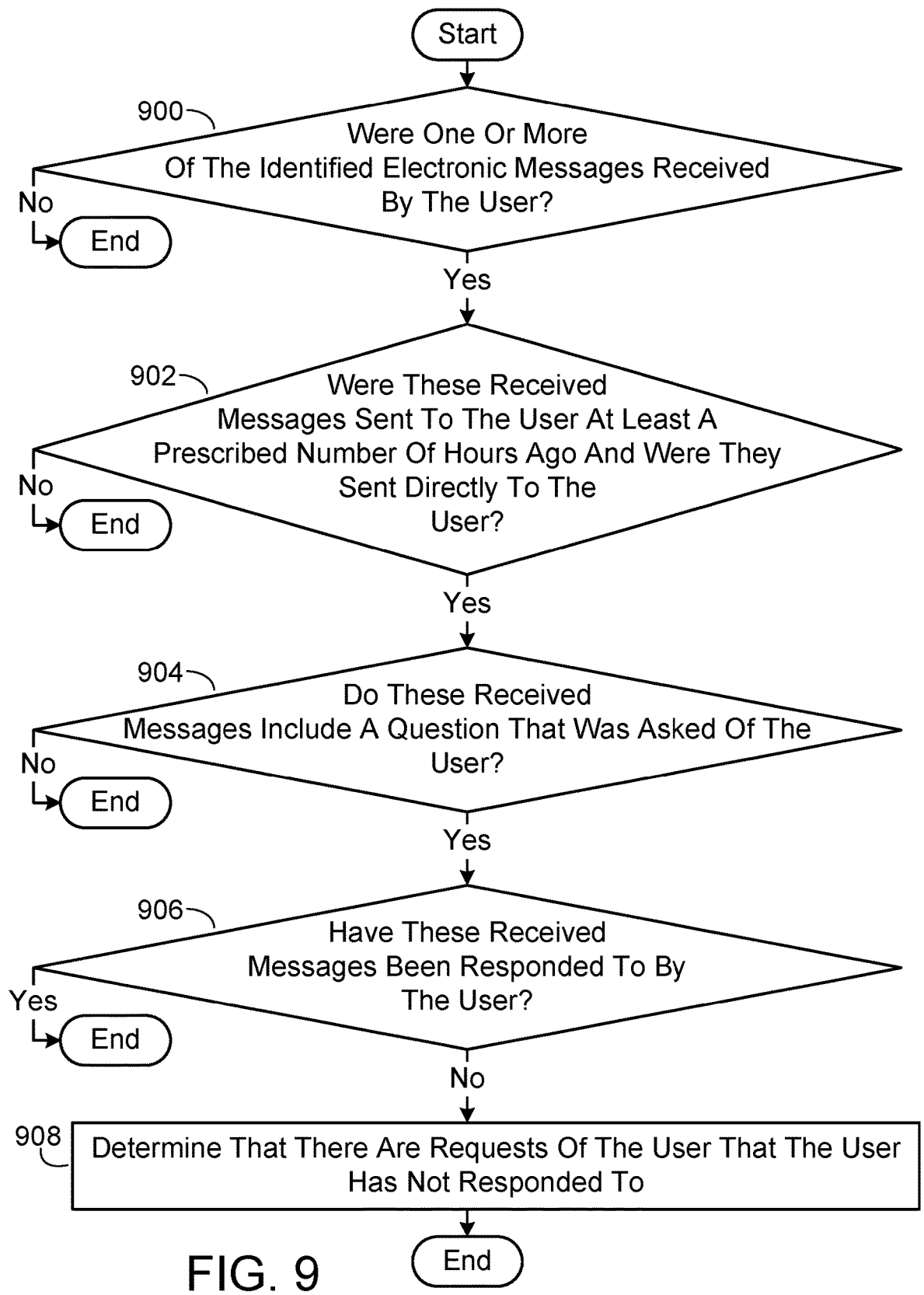

FIG. 9 illustrates an exemplary implementation, in simplified form, of a process for heuristically analyzing the identified electronic messages that were received by or sent by the user to determine if there are requests of the user that the user has not responded to. As exemplified in FIG. 9, whenever one or more of the identified electronic messages were received by the user (process action 900, Yes), and whenever these received messages were sent to the user at least a prescribed number of hours ago and were sent directly to the user (e.g., in the case where a given one of the identified electronic messages is an email message, the user appears on the "To:" line of the email message) (process action 902, Yes), and whenever these received messages include a question that was asked of the user (process action 904, Yes), and whenever these received messages have not been responded to by the user (process action 906, No), it is determined that there are requests of the user that the user has not responded to (process action 908). In a tested version of the requests of the user awaiting a response implementation the prescribed number of hours was 24 hours. Other versions of the requests of the user awaiting a response implementation are also possible where the prescribed number of hours is either less than or greater than 24 hours.

In another implementation of the insight provisioning technique described herein the insights that are calculated in action 802 of FIG. 8 include there being one or more requests of one or more people that were made by the user, but the user has not received a response to these requests— this particular implementation is hereafter simply referred to as the requests made by the user awaiting a response implementation. It is noted that each of these requests may be any type of task or action that the user has asked another person to perform. Once action 802 has determined that there are one or more requests of one or more people that were made by the user, but the user has not received a response to these requests, the requests made by the user awaiting a response implementation may utilize the identified electronic messages that were received by or sent by the user to determine various types of information related to each of these requests that was made by the user such as an identifier of each of these people, or a description of each of the requests that was made by the user, or the like. Accordingly, the insights provisioning of action 804 can provide the user with each of the just-described types of information related to each of the requests of one or more people that were made by the user, but the user has not received a response to these requests. As will be appreciated from the more-detailed description of the requests made by the user awaiting a response implementation that follows, this implementation advantageously increases the user's efficiency and productivity by automatically letting the user know ahead of time that they have not yet received a response from the people who the user made one or more requests of (as such, the user does not have to spend their time manually checking each of the electronic messages they sent in an attempt to identify such requests that they're still waiting to receive a response to). The user is thus reminded to follow-up with each of the people who the user made one or more requests of.

Figure 10:
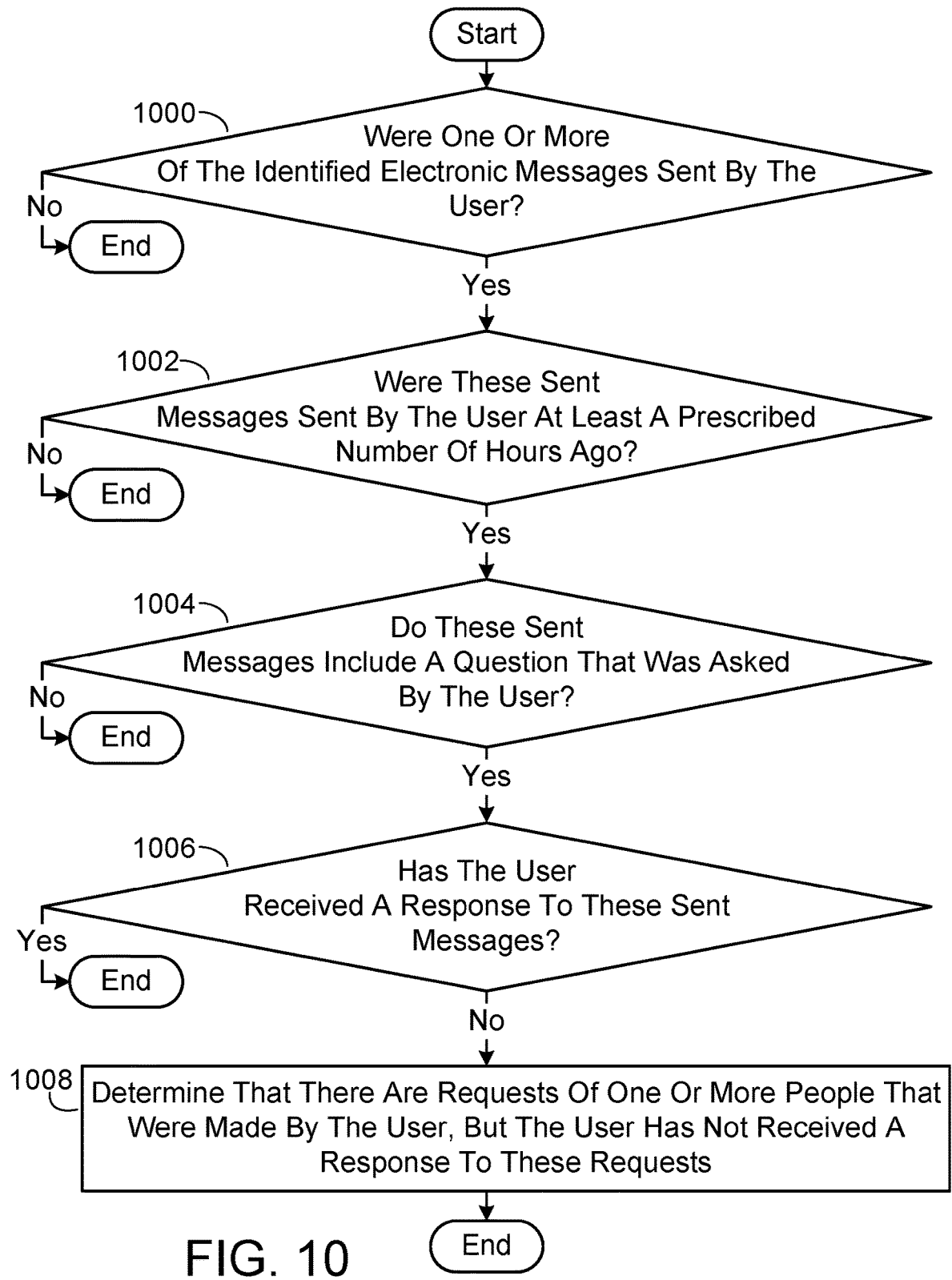
FIG. 10 is a flow diagram illustrating an exemplary implementation, in simplified form, of a process for heuristically analyzing identified electronic messages that were received by or sent by the user to determine if there are one or more requests of one or more people that were made by the user, but the user has not received a response to these requests.

FIG. 10 illustrates an exemplary implementation, in simplified form, of a process for heuristically analyzing the identified electronic messages that were received by or sent by the user to determine if there are one or more requests of one or more people that were made by the user, but the user has not received a response to these requests. As exemplified in FIG. 10, whenever one or more of the identified electronic messages were sent by the user (process action 1000, Yes), and whenever these sent messages were sent by the user at least the aforementioned prescribed number of hours ago (process action 1002, Yes), and whenever these sent messages include a question that was asked by the user (process action 1004, Yes), and whenever the user has not received a response to these sent messages (process action 1006, No), it is determined that there are requests of one or more people that were made by the user, but the user has not received a response to these requests (process action 1008).

In another implementation of the insight provisioning technique described herein the insights that are calculated in action 802 of FIG. 8 include the user having one or more electronic messages that were sent directly to the user which they have not read. In another implementation of the insight provisioning technique the insights that are calculated in action 802 include the user having one or more electronic messages that were sent to the user by their manager which the user has not read. In another implementation of the insight provisioning technique the insights that are calculated in action 802 include the user having one or more electronic messages that are marked urgent which the user has not read.

Figure 11:
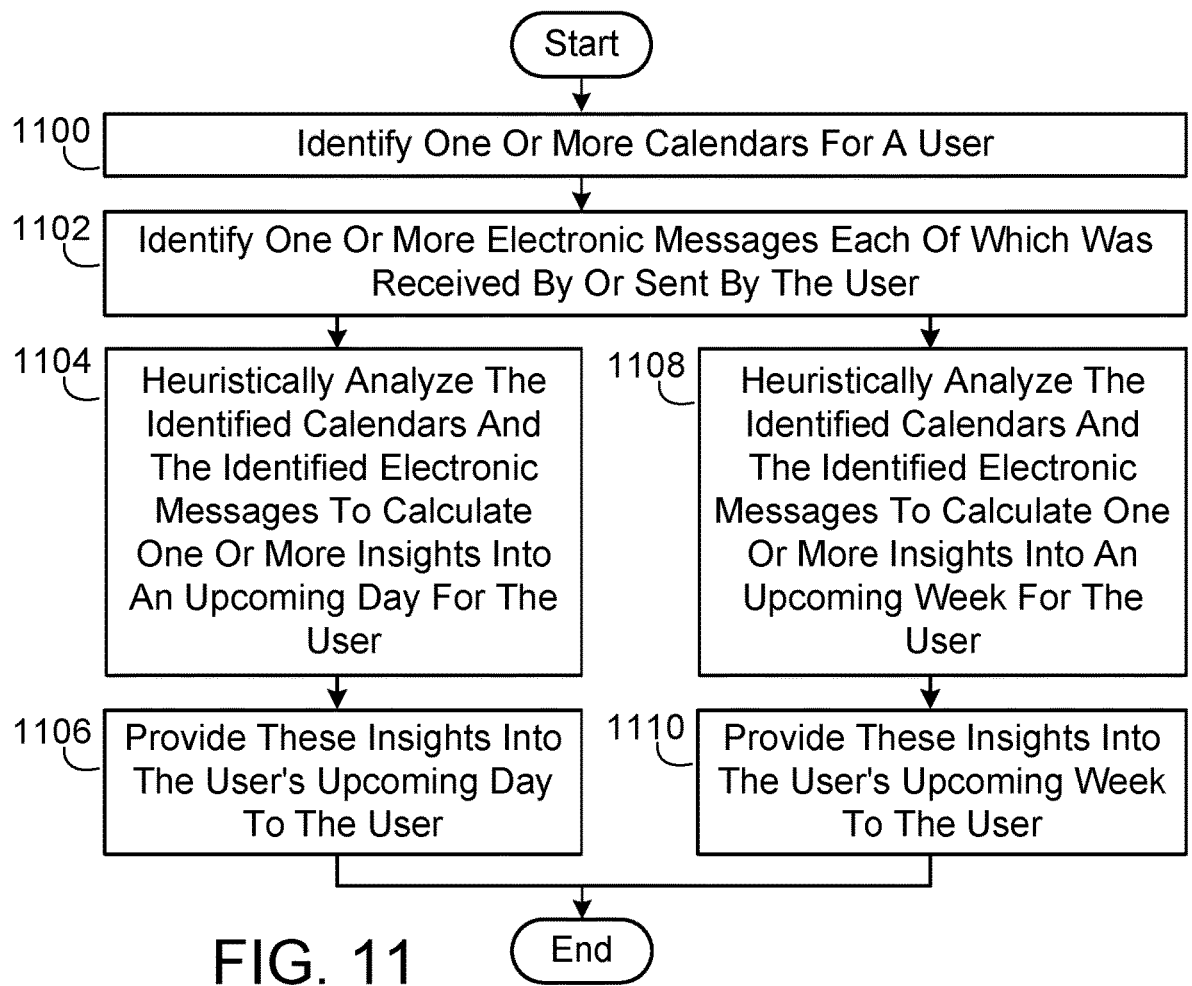
FIG. 11 is a flow diagram illustrating yet another implementation, in simplified form, of a process for providing insights to a user.

FIG. 11 illustrates yet another implementation, in simplified form, of a process for providing insights to a user. In an exemplary implementation of the insight provisioning technique described herein the process illustrated in FIG. 11 is realized on the system framework 100 illustrated in FIG. 1. As exemplified in FIG. 11, the process starts with identifying one or more calendars for the user (process action 1100), and also identifying one or more electronic messages each of which was received by or sent by the user (process action 1102). The identified calendars and the identified electronic messages are then heuristically analyzed to calculate one or more insights into an upcoming day for the user (process action 1104). These insights into the user's upcoming day are then provided to the user (process action 1106). The identified calendars and the identified electronic messages may also be heuristically analyzed to calculate one or more insights into an upcoming week for the user (process action 1108), and these insights into the user's upcoming week may also be provided to the user (process action 1110). Exemplary methods for providing the insights into the user's upcoming day/week to the user are described in more detail hereafter. Given the foregoing and the more-detailed description that follows, it will be appreciated that the combination of actions 1104 and 1106, and the combination of actions 1108 and 1110, have the advantageous effect of increasing the efficiency and productivity of the user.

Referring again to FIGS. 3 and 11, the heuristic analysis of actions 1104 and 1108 can calculate many different types of insights into the user's upcoming day and week respectively. By way of example but not limitation, in one implementation of the insight provisioning technique described herein the insights that are calculated in actions 1104 and 1108 include the user being scheduled to meet with one or more atypical people during the user's upcoming day and week respectively—this particular implementation thus provides an alternative version of the aforementioned atypical people implementation that was associated with action 302 and action 306. It is noted that using actions 1104 and 1108 to determine that the user is scheduled to meet with one or more atypical people during the user's upcoming day and week respectively can increase the accuracy of these insights since the identified electronic messages may provide additional details related to the people who the user has met with in the past that may not be available in the identified calendars.

It will be appreciated that the various types of insights into the user's upcoming day/week that are described herein may be provided to the user in a variety ways, several examples of which will now be described in more detail. As described heretofore, each end-user computing device that is utilized by the user may run an insight provisioning application via which the user can receive and interact with the various insights into the user's upcoming day and week. In one implementation of the insight provisioning technique described herein current insights into the user's upcoming day/week can be organized into one or more cards that the insight provisioning application can display to the user at prescribed times. For example, when the user first opens the insight provisioning application on their end-user computing device at the beginning of a new day (e.g., in the morning), the application can display a beginning of new day card to the user, where this card includes a structured and prioritized (e.g., rank-ordered) list of current insights into the user's upcoming day. The insight provisioning application can also display an end of current day card to the user at the end of each day (e.g., in the evening), where this card includes a structured and prioritized list of current insights into the user's upcoming day. When the user first opens the insight provisioning application at the beginning of a new week, the application can display a beginning of new week card to the user, where this card includes a structured and prioritized list of current insights into the user's upcoming week. In addition to the just-described exemplary cards which are maintained and displayed by the insight provisioning application itself, in another implementation of the insight provisioning technique a notification can be displayed on the lock screen of the user's end-user computing device, where this notification informs the user that they have insights into their upcoming day/week the current details of which can be viewed by selecting the notification. In another implementation of the insight provisioning technique the current insights into the user's upcoming day/week can be organized into a webpage that the user can access whenever they select a prescribed link to this webpage using any conventional web browser application. In another implementation of the insight provisioning technique the current insights into the user's upcoming day/week can be provided to the user in the form of an audio message that is spoken to the user—this particular implementation is advantageous in the case where the user is either vision impaired or currently unable to see the display screen on their computing device.

Figure 12:
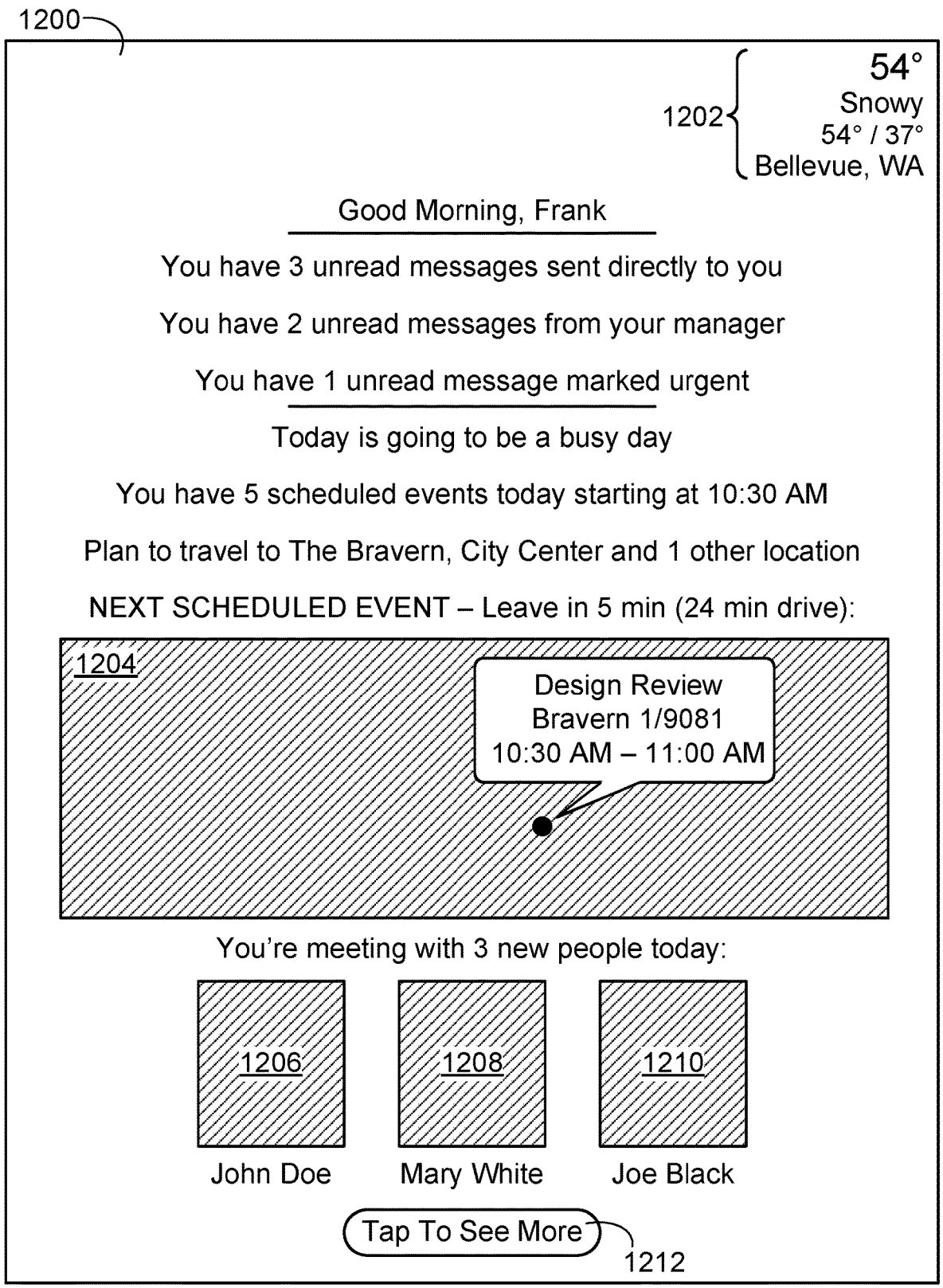
FIG. 12 is a diagram illustrating an exemplary implementation, in simplified form, of a beginning of new day card that may be displayed to a user at the beginning of a new day.

FIG. 12 illustrates an exemplary implementation, in a greatly simplified form, of the just-described beginning of new day card that may be displayed to a user named Frank on his end-user computing device when he first opens the insight provisioning application at the beginning of a new day. As exemplified in FIG. 12, the beginning of new day card 1200 includes a structured and prioritized list of current insights into Frank's upcoming day. More particularly, the card 1200 informs Frank that he currently has three electronic messages that were sent directly to him which he has not read, and two electronic messages that were sent to him by his manager which he has not read, and one electronic message that is marked urgent which he has not read. The card 1200 also informs Frank that his upcoming day is going to be a busy day since he has five scheduled events today the first of which is a Design Review that starts at 10:30 AM at The Bravern. The card 1200 also informs Frank that he should plan to leave in five minutes for the Design Review event and should expect to spend 24 minutes driving to this event. The card 1200 also provides Frank with a map 1204 of the area surrounding The Bravern to assist with his drive thereto, where this map 1204 may include an overlay (not shown) of a suggested route to take for this drive. Besides having to travel to The Bravern today, the card 1200 informs Frank that he'll also have to travel to the City Center and one other location for his scheduled events today. The card 1200 also informs Frank that he is scheduled to meet with three atypical (e.g., new) people today, namely John Doe, Mary White and Joe Black, and provides Frank with a photograph 1206/1208/1210 of each of these people. The card 1200 also allows Frank to tap/select a button 1212 to see additional insights into his upcoming day. The card can optionally also include a summary of the current weather conditions 1202 for Frank's current geographic location (namely, Bellevue, Wash.).

Figure 13:
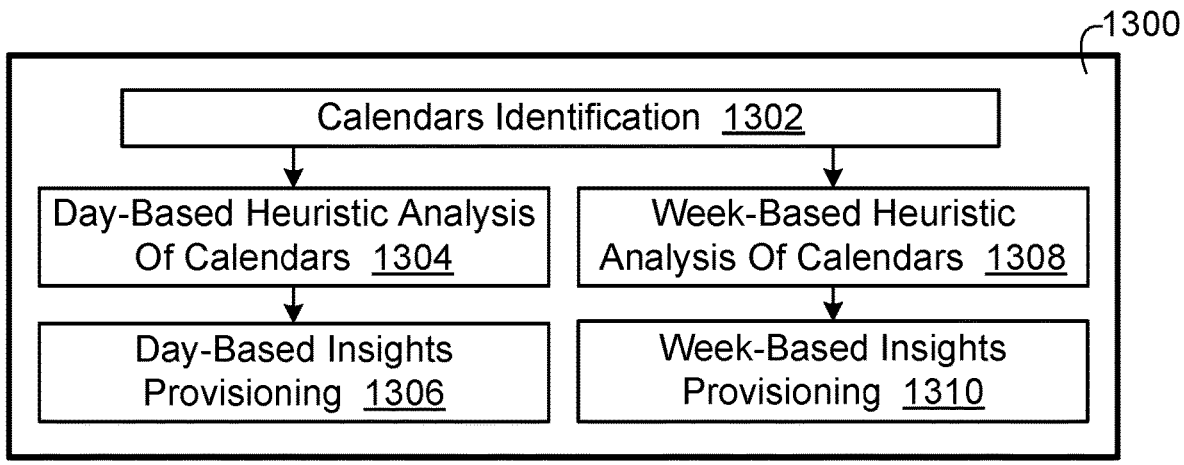
FIG. 13 is a diagram illustrating one implementation, in simplified form, of an insight provider computer program for providing insights to a user.

FIG. 13 illustrates one implementation, in simplified form, of an insight provider computer program for providing insights to a user. As exemplified in FIG. 13 and referring again to FIG. 3, the insight provider computer program 1300 includes, but is not limited to, a calendars identification sub-program 1302 that performs action 300, a day-based heuristic analysis of calendars sub-program 1304 that performs action 302, a day-based insights provisioning sub-program 1306 that performs action 304, a week-based heuristic analysis of calendars sub-program 1308 that performs action 306, and a week-based insights provisioning sub-program 1310 that performs action 308. Each of the just-described sub-programs is realized on a computing device such as that which is described in more detail in the Exemplary Operating Environments section which follows. More particularly and by way of example but not limitation, and referring again to FIGS. 1 and 2, in one implementation of the insight provisioning technique described herein the just-described sub-programs may be realized on the computing devices 118/120. In another implementation of the insight provisioning technique the just-described sub-programs may be realized on the computing devices 204/208.

Figure 14:
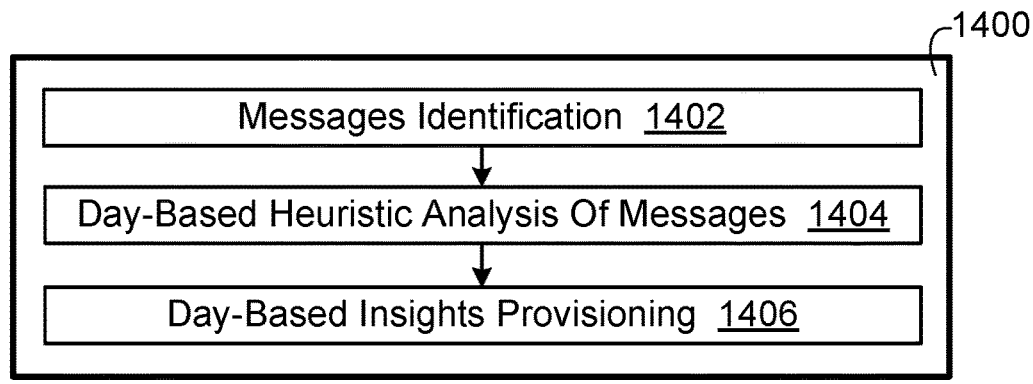
FIG. 14 is a diagram illustrating another implementation, in simplified form, of an insight provider computer program for providing insights to a user.

FIG. 14 illustrates another implementation, in simplified form, of an insight provider computer program for providing insights to a user. As exemplified in FIG. 14 and referring again to FIG. 8, the insight provider computer program 1400 includes, but is not limited to, a messages identification sub-program 1402 that performs action 800, a day-based heuristic analysis of messages sub-program 1404 that performs action 802, and a day-based insights provisioning sub-program 1406 that performs action 804. Each of the just-described sub-programs is realized on a computing device such as that which is described in more detail in the Exemplary Operating Environments section which follows. More particularly and by way of example but not limitation, and referring again to FIGS. 1 and 2, in one implementation of the insight provisioning technique described herein the just-described sub-programs may be realized on the computing devices 118/120. In another implementation of the insight provisioning technique the just-described sub-programs may be realized on the computing devices 204/208.

Figure 15:
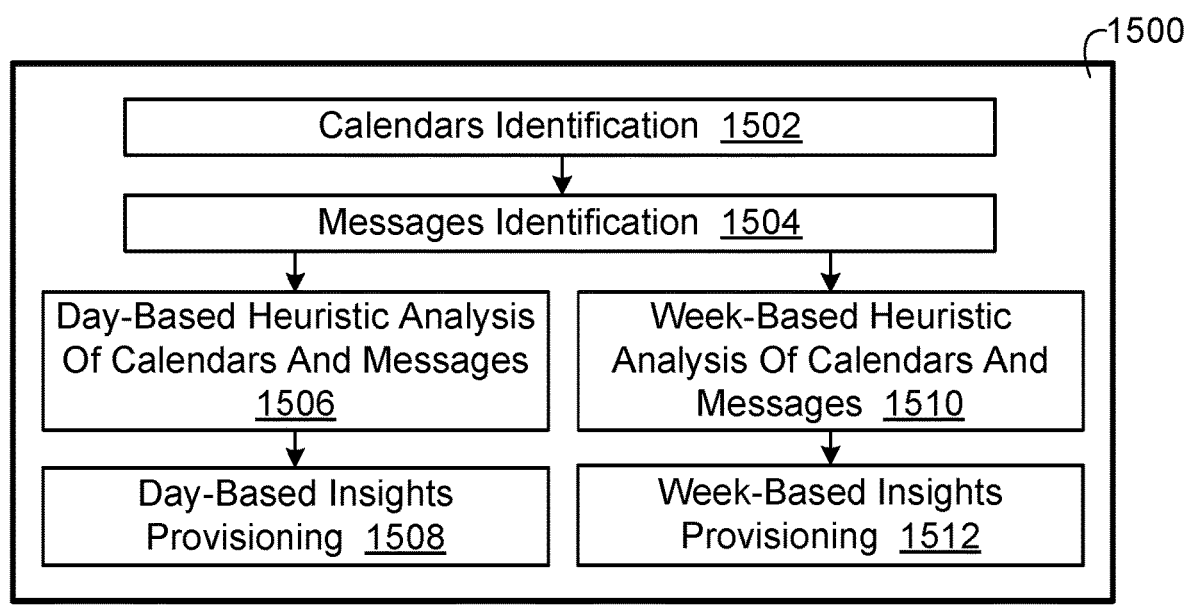
FIG. 15 is a diagram illustrating yet another implementation, in simplified form, of an insight provider computer program for providing insights to a user.

FIG. 15 illustrates yet another implementation, in simplified form, of an insight provider computer program for providing insights to a user. As exemplified in FIG. 15 and referring again to FIG. 11, the insight provider computer program 1500 includes, but is not limited to, a calendars identification sub-program 1502 that performs action 1100, a messages identification sub-program 1504 that performs action 1102, a day-based heuristic analysis of calendars and messages sub-program 1506 that performs action 1104, a day-based insights provisioning sub-program 1508 that performs action 1106, a week-based heuristic analysis of calendars and messages sub-program 1510 that performs action 1108, and a week-based insights provisioning sub-program 1512 that performs action 1110. Each of the just-described sub-programs is realized on a computing device such as that which is described in more detail in the Exemplary Operating Environments section which follows. More particularly and by way of example but not limitation, and referring again to FIGS. 1 and 2, in one implementation of the insight provisioning technique described herein the just-described sub-programs may be realized on the computing devices 118/120. In another implementation of the insight provisioning technique the just-described sub-programs may be realized on the computing devices 204/208.

3.0 Other Implementations

While the insight provisioning technique has been described by specific reference to implementations thereof, it is understood that variations and modifications thereof can be made without departing from the true spirit and scope of the insight provisioning technique. It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Exemplary Operating Environments

Figure 16:
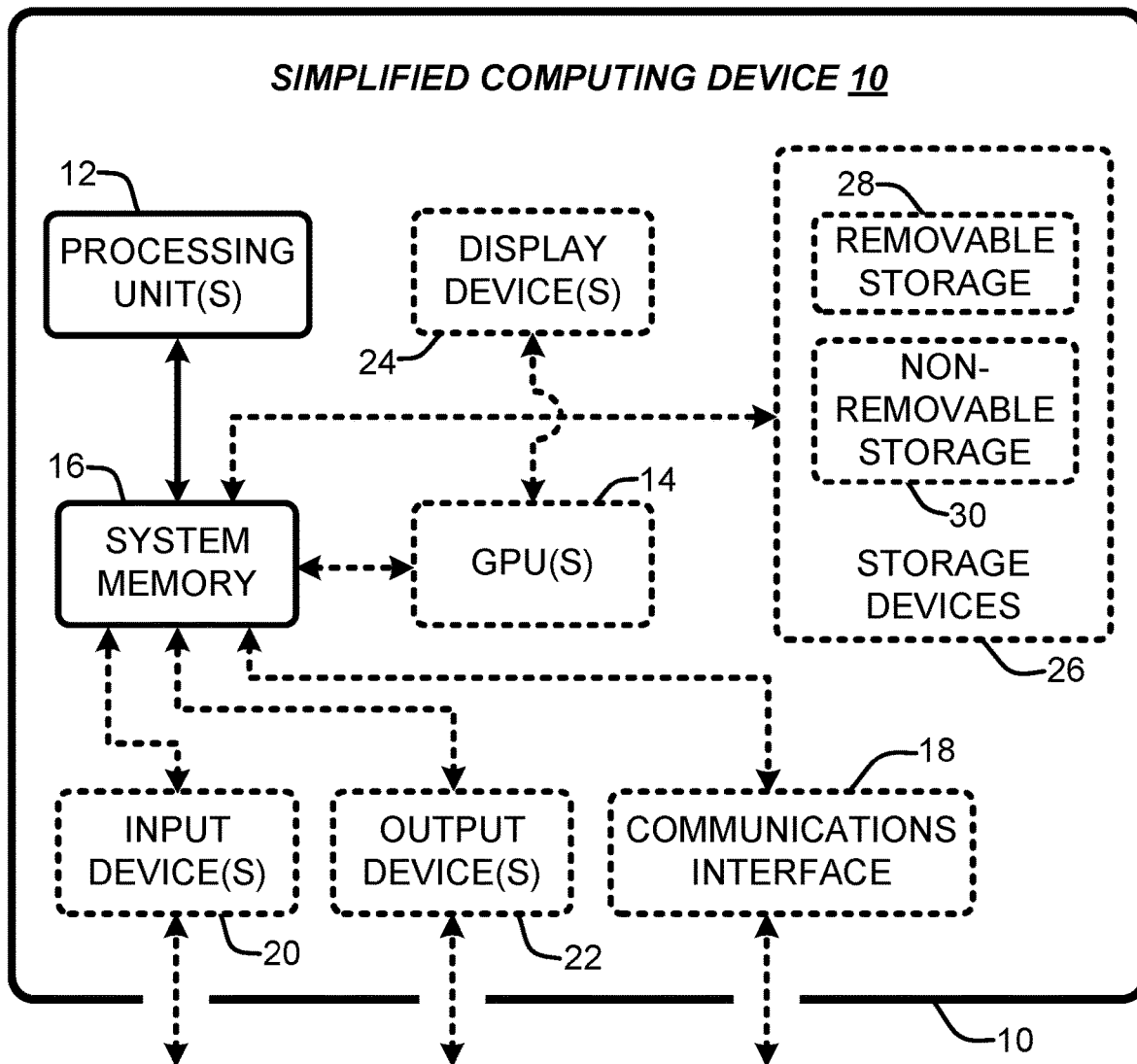
FIG. 16 is a diagram illustrating a simplified example of a general-purpose computer system on which various implementations and elements of the insight provisioning technique, as described herein, may be realized.

The insight provisioning technique implementations described herein are operational within numerous types of general purpose or special purpose computing system environments or configurations. FIG. 16 illustrates a simplified example of a general-purpose computer system on which various implementations and elements of the insight provisioning technique, as described herein, may be implemented. It is noted that any boxes that are represented by broken or dashed lines in the simplified computing device 10 shown in FIG. 16 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the insight provisioning technique implementations described herein, the device should have a sufficient computational capability and system memory to enable basic computational operations. In particular, the computational capability of the simplified computing device 10 shown in FIG. 16 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the insight provisioning technique implementations described herein, including input, output, control, feedback, and response to one or more users or other devices or systems associated with the insight provisioning technique implementations, are enabled by a variety of Natural User Interface (NUI) scenarios. The NUI techniques and scenarios enabled by the insight provisioning technique implementations include, but are not limited to, interface technologies that allow one or more users user to interact with the insight provisioning technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the insight provisioning technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the insight provisioning technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 16 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various insight provisioning technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The insight provisioning technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The insight provisioning technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

5.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation a first system is employed for providing insights to a user. This first system includes a first insight provider that includes one or more computing devices, the computing devices being in communication with each other via a computer network whenever there is a plurality of computing devices. The first insight provider also includes a computer program having a plurality of sub-programs executable by the computing devices, where the sub-programs configure the computing devices to, identify one or more calendars for the user, heuristically analyze the identified calendars to calculate one or more insights into an upcoming day for the user, and provide the insights into the upcoming day to the user.

In one implementation of the just-described first system the insights into the upcoming day include the user being scheduled to meet with one or more atypical people during the upcoming day, and the sub-program for providing the insights into the upcoming day to the user includes a sub-program for providing the user with information related to these people, this information including one or more of: a count of these people; or a photograph of each of these people; or a name of each of these people; or a title associated with each of these people; or an office location associated with each of these people. In another implementation the insights into the upcoming day include the user being scheduled for an event that will take place in one or more atypical locations during the upcoming day, and the sub-program for providing the insights into the upcoming day to the user includes a sub-program for providing the user with information related to these locations, this information including one or more of: a count of these locations; or a map of where each of these locations is situated; or a street address associated with each of these locations; or a building number associated with each of these locations; or a room number associated with each of these locations; or an amount of time it is expected to take for the user to travel from their current location to each of these locations. In another implementation the insights into the upcoming day include one of: the upcoming day being a busy day; or the upcoming day being a light day. In another implementation the insights into the upcoming day include the user having no time for lunch in the upcoming day.

In another implementation the insights into the upcoming day include there being schedule changes for one or more events that are scheduled to occur during the upcoming day, and the sub-program for providing the insights into the upcoming day to the user includes a sub-program for providing the user with information related to these changes, this information including one or more of: a title associated with each of these events; or details of the schedule change for each of these events; or a count of these events. In another implementation the insights into the upcoming day include the user having a scheduled event conflict in their upcoming day, this conflict including there being two or more events that are scheduled to occur during a common period of time or back-to-back in different locations, wherein each of these events is marked as busy or tentative in the identified calendars, and the sub-program for providing the insights into the upcoming day to the user includes a sub-program for providing the user with one or more recommended actions to take in order to resolve this conflict, these actions being specifically tailored to the meaningfulness to the user of each of these events and how difficult it will be to reschedule each of these events. In another implementation the insights into the upcoming day include an amount of time it is expected to take for the user to commute from home to work or from work to home. In another implementation the sub-programs further configure the computing devices to: heuristically analyze the identified calendars to calculate one or more insights into an upcoming week for the user; and provide these insights into the upcoming week to the user.

The implementations and versions described in any of the previous paragraphs in this section may also be combined with each other, and with one or more of the implementations and versions described prior to this section. For example, some or all of the preceding implementations and versions may be combined with the foregoing implementation where the sub-programs further configure the computing devices to: heuristically analyze the identified calendars to calculate one or more insights into an upcoming week for the user; and provide these insights into the upcoming week to the user.

In another implementation a second system is employed for providing insights to a user. This second system includes a second insight provider that includes one or more computing devices, the computing devices being in communication with each other via a computer network whenever there is a plurality of computing devices. The second insight provider also includes a computer program having a plurality of sub-programs executable by the computing devices, where the sub-programs configure the computing devices to, identify one or more electronic messages each of which was received by or sent by the user, heuristically analyze the identified electronic messages to calculate one or more insights into an upcoming day for the user, and provide the insights into the upcoming day to the user.

In one implementation of the just-described second system the insights into the upcoming day include there being requests of the user that the user has not responded to, and the sub-program for providing the insights into the upcoming day to the user includes a sub-program for providing the user with information related to these requests, this information including one or more of: an identifier of a person who made each of these requests; or a description of each of these requests. In another implementation the insights into the upcoming day include there being one or more requests of one or more people that were made by the user, but the user has not received a response to these requests, and the sub-program for providing the insights into the upcoming day to the user includes a sub-program for providing the user with information related to these requests, this information including one or more of: an identifier of each of these people; or a description of each of these requests. In another implementation the insights into the upcoming day include one or more of: the user having one or more electronic messages that were sent directly to the user which they have not read; or the user having one or more electronic messages that are marked urgent which the user has not read. In another implementation the insights into the upcoming day include the user having one or more electronic messages that were sent to the user by their manager which the user has not read.

In another implementation the identified electronic messages include one or more email messages. In one version of the just-described implementation the one or more email messages include one or more email threads. In another implementation the identified electronic messages include one or more of: one or more instant text messages; or one or more instant multimedia messages; or one or more online chat messages; or one or more fax messages having been converted to text using an optical character recognition method; or one or more recorded voice messages having been converted to text using a speech-to-text conversion method; or one or more recorded video messages that include audio having been converted to text using a speech-to-text conversion method; or one or more web-based blog postings; or one or more user postings on one or more social networking websites.

The implementations and versions described in any of the previous paragraphs in this section may also be combined with each other, and with one or more of the implementations and versions described prior to this section. For example, some or all of the preceding implementations and versions may be combined with the foregoing implementation where the identified electronic messages include one or more of: one or more instant text messages; or one or more instant multimedia messages; or one or more online chat messages; or one or more fax messages having been converted to text using an optical character recognition method; or one or more recorded voice messages having been converted to text using a speech-to-text conversion method; or one or more recorded video messages that include audio having been converted to text using a speech-to-text conversion method; or one or more web-based blog postings; or one or more user postings on one or more social networking websites.

In another implementation a computer-implemented process is employed for providing insights to a user. This process includes the actions of: using one or more computing devices to perform the following process actions, the computing devices being in communication with each other via a computer network whenever a plurality of computing devices is used: identifying one or more calendars for the user; identifying one or more electronic messages each of which was received by or sent by the user; heuristically analyzing the identified calendars and the identified electronic messages to calculate one or more insights into an upcoming day for the user; and providing the insights into the upcoming day to the user.

In one implementation of the just-described process the insights into the upcoming day include the user being scheduled to meet with one or more atypical people during the upcoming day, and the process action of providing the insights into the upcoming day to the user includes an action of providing the user with information related to these people, this information including one or more of: a count of these people; or a photograph of each of these people; or a name of each of these people; or a title associated with each of these people; or an office location associated with each of these people. In another implementation the process further includes the actions of: heuristically analyzing the identified calendars and the identified electronic messages to calculate one or more insights into an upcoming week for the user; and providing these insights into this upcoming week to the user.

The implementations and versions described in any of the previous paragraphs in this section may also be combined with each other, and with one or more of the implementations and versions described prior to this section. For example, some or all of the preceding implementations and versions may be combined with the foregoing implementation where the process further includes the actions of: heuristically analyzing the identified calendars and the identified electronic messages to calculate one or more insights into an upcoming week for the user; and providing these insights into this upcoming week to the user.

In another implementation a first insight provisioning system is implemented by a first means for providing insights to a user. The first insight provisioning system includes a first insight provider that includes one or more computing devices. These computing devices are in communication with each other via a computer network whenever there is a plurality of computing devices. These computing devices include processors that are configured to execute: a first identification step for identifying one or more calendars for the user; a first analysis step for heuristically analyzing the identified calendars to calculate one or more insights into an upcoming day for the user; and a first provisioning step for providing the insights into the upcoming day to the user.

In one implementation of the just-described first insight provisioning system the insights into the upcoming day include the user being scheduled to meet with one or more atypical people during the upcoming day, and the first provisioning step for providing the insights into the upcoming day to the user includes a second provisioning step for providing the user with information related to these people. In another implementation the insights into the upcoming day include the user being scheduled for an event that will take place in one or more atypical locations during the upcoming day, and the first provisioning step for providing the insights into the upcoming day to the user includes a third provisioning step for providing the user with information related to these locations. In another implementation the insights into the upcoming day include there being schedule changes for one or more events that are scheduled to occur during the upcoming day, and the first provisioning step for providing the insights into the upcoming day to the user includes a fourth provisioning step for providing the user with information related to these changes. In another implementation the insights into the upcoming day include the user having a scheduled event conflict in their upcoming day, this conflict including there being two or more events that are scheduled to occur during a common period of time or back-to-back in different locations, where each of these events is marked as busy or tentative in the identified calendars, and the first provisioning step for providing the insights into the upcoming day to the user includes a fifth provisioning step for providing the user with one or more recommended actions to take in order to resolve this conflict, these actions being specifically tailored to the meaningfulness to the user of each of these events and how difficult it will be to reschedule each of these events. In another implementation the processors are further configured to execute: a second analysis step for heuristically analyzing the identified calendars to calculate one or more insights into an upcoming week for the user; and a sixth provisioning step for providing these insights into this upcoming week to the user.

In another implementation a second insight provisioning system is implemented by a second means for providing insights to a user. The second insight provisioning system includes a second insight provider that includes one or more computing devices. These computing devices are in communication with each other via a computer network whenever there is a plurality of computing devices. These computing devices include processors that are configured to execute: a second identification step for identifying one or more electronic messages each of which was received by or sent by the user; a third analysis step for heuristically analyzing the identified electronic messages to calculate one or more insights into an upcoming day for the user; and a seventh provisioning step for providing the insights into the upcoming day to the user.

In one implementation of the just-described second insight provisioning system the insights into the upcoming day include there being requests of the user that the user has not responded to, and the seventh provisioning step for providing the insights into the upcoming day to the user include an eighth provisioning step for providing the user with information related to these requests. In another implementation the insights into the upcoming day include there being one or more requests of one or more people that were made by the user, but the user has not received a response to these requests, and the seventh provisioning step for providing the insights into the upcoming day to the user include a ninth provisioning step for providing the user with information related to these requests.

In various implementations an insights provisioning process is implemented by a step for providing insights to a user. For example, in one implementation the insights provisioning process includes a step for identifying one or more calendars for the user; a step for identifying one or more electronic messages each of which was received by or sent by the user; a step for heuristically analyzing the identified calendars and the identified electronic messages to calculate one or more insights into an upcoming day for the user; and a step for providing the insights into the upcoming day to the user.

In one implementation of the just-described insights provisioning process the insights into the upcoming day include the user being scheduled to meet with one or more atypical people during the upcoming day, and the step for providing the insights into the upcoming day to the user includes a step for providing the user with information related to these people. In another implementation the insights provisioning process further includes a step for heuristically analyzing the identified calendars and the identified electronic messages to calculate one or more insights into an upcoming week for the user; and a step for providing these insights into this upcoming week to the user.

Wherefore, what is claimed is:

1. A system comprising:
an insight provider component, executing on one or more computing devices, configured to execute processing operations for automated generation of insights for remediation of a scheduling conflict between two or more electronic invite entries scheduled and presented in an electronic calendar of a single user, wherein the processing operations, executed by the insight provider component, comprise:
identifying the electronic calendar for the single user,
identifying the scheduling conflict between the two or more electronic invite entries scheduled and presented in the electronic calendar, wherein the two or more electronic invite entries each invite the single user to attend a meeting at an overlapping time period,
heuristically analyzing data associated with the electronic calendar for the single user to generate heuristic scoring for each of the two or more electronic invite entries that is usable for insight generation pertaining to resolving the scheduling conflict, wherein the heuristic scoring, for each the two or more electronic invite entries, is an aggregate score from generation of:
a first heuristic scoring metric that scores an importance of each of two or more electronic invite entries to the single user based on a determination as to whether the single user created one or more of the two or more electronic invite entries associated with the scheduling conflict, wherein the determination is derived from analysis of invite data of the two or more electronic invite entries, and a second heuristic scoring metric that scores a difficulty for rescheduling each of the two or more electronic invite entries based on analysis of the data associated with the electronic calendar for the single user, generating one or more insights for resolution of the scheduling conflict based on a comparative analysis of the heuristic scoring for each of the two or more electronic invite entries, generating a graphical user interface prompt that identifies the one or more insights for resolution of the scheduling conflict, and providing, through a graphical user interface, the graphical user interface prompt that identifies the one or more insights for resolution of the scheduling conflict.

2. A method comprising:

executing, on at least one processor, an insight provider component that is configured to execute processing operations for automated generation of insights for remediation of a scheduling conflict between two or more electronic invite entries scheduled and presented in an electronic calendar of a single user, wherein the processing operations, executed by the insight provider component, comprise:

identifying the electronic calendar for the single user,
identifying the scheduling conflict between the two or more electronic invite entries scheduled and presented in the electronic calendar, wherein the two or more electronic invite entries each invite the single user to attend a meeting at an overlapping time period, heuristically analyzing data associated with the electronic calendar for the single user to generate heuristic scoring for each of the two or more electronic invite entries that is usable for insight generation pertaining to resolving the scheduling conflict, wherein the heuristic scoring, for each the two or more electronic invite entries, is an aggregate score from generation of:

a first heuristic scoring metric that scores an importance of each of two or more electronic invite entries to the single user based on a determination as to whether the single user created one or more of the two or more electronic invite entries associated with the scheduling conflict, wherein the determination is derived from analysis of invite data of the two or more electronic invite entries, and a second heuristic scoring metric that scores a difficulty for rescheduling each of the two or more electronic invite entries based on analysis of the data associated with the electronic calendar for the single user, generating one or more insights for resolution of the scheduling conflict based on a comparative analysis of the heuristic scoring for each of the two or more electronic invite entries, generating a graphical user interface prompt that identifies the one or more insights for resolution of the scheduling conflict, and providing, through a graphical user interface, the graphical user interface prompt that identifies the one or more insights for resolution of the scheduling conflict.

3. The system of claim 1, wherein the insight provider component is further configured to automatically resolve the scheduling conflict based on the one or more insights, and wherein the graphical user interface prompt provides notification that the scheduling conflict has been automatically resolved.

4. The system of claim 1, wherein the one or more insights comprises a suggestion for resolving the scheduling conflict.

5. The system of claim 4, wherein the suggestion for resolving the scheduling conflict is provided to the single user through the graphical user interface prompt.

6. The system of claim 1, wherein the first heuristic scoring metric is determined based on an evaluation of an attendance response by the single user to each of the two or more electronic invite entries determined from analyzing data of the two or more electronic invite entries scheduled and presented in the electronic calendar.

7. The method of claim 2, wherein the insight provider component is further configured to automatically resolve the scheduling conflict based on a result of the one or more insights, and wherein the graphical user interface prompt provides notification that the scheduling conflict has been automatically resolved.

8. The method of claim 2, wherein the one or more insights comprises a suggestion for resolving the scheduling conflict.

9. The method of claim 8, wherein the suggestion for resolving the scheduling conflict is provided through the graphical user interface prompt.

10. The method of claim 2, wherein the first heuristic scoring metric is determined based on an evaluation of an attendance response by the single user to each of the two or more electronic invite entries determined from analyzing data of the two or more electronic invite entries scheduled and presented in the electronic calendar.

11. A computer-implemented method comprising:
identifying an electronic calendar for a single user,
identifying a scheduling conflict between the two or more electronic invite entries that are scheduled and presented in the electronic calendar of the single user, wherein the two or more electronic invite entries each invite the single user to attend a meeting at an overlapping time period, heuristically analyzing data associated with the electronic calendar for the single user to generate heuristic scoring for each of the two or more electronic invite entries that is usable for insight generation pertaining to resolving the scheduling conflict, wherein the heuristic scoring, for each the two or more electronic invite entries, is an aggregate score from generation of:

a first heuristic scoring metric that scores an importance of each of two or more electronic invite entries to the single user based on a determination as to whether the single user created one or more of the two or more electronic invite entries associated with the scheduling conflict, wherein the determination is derived from analysis of invite data of the two or more electronic invite entries, and a second heuristic scoring metric that scores a difficulty for rescheduling each of the two or more electronic invite entries based on analysis of the data associated with the electronic calendar for the single user, generating one or more insights for resolution of the scheduling conflict based on a comparative analysis of the heuristic scoring for each of the two or more electronic invite entries, generating a graphical user interface prompt that identifies the one or more insights for resolution of the scheduling conflict, and providing, through a graphical user interface, the graphical user interface prompt that identifies the one or more insights for resolution of the scheduling conflict.

12. The computer-implemented method of claim 11, wherein the insight provider component is further configured to automatically resolve the scheduling conflict based on the one or more insights, and wherein the graphical user interface prompt provides notification that the scheduling conflict has been automatically resolved.

13. The computer-implemented method of claim 11, wherein the suggestion for resolving the scheduling conflict is provided through the graphical user interface prompt.

14. The computer-implemented method of claim 11, wherein the first heuristic scoring metric is determined based on an evaluation of an attendance response by the single user to each of the two or more electronic invite entries determined from analyzing data of the two or more electronic invite entries scheduled and presented in the electronic calendar.

15. The system of claim 1, wherein the heuristic scoring, for each the two or more electronic invite entries, is an aggregate score from generation of the first heuristic scoring metric, the second heuristic scoring metric and a third heuristic scoring metric that scores the importance of each of two or more electronic invite entries to the single user based on whether the single user is a required attendee or an optional attendee.

16. The system of claim 1, wherein the heuristic scoring, for each the two or more electronic invite entries, is an aggregate score from generation of the first heuristic scoring metric, the second heuristic scoring metric and a third heuristic scoring metric that scores the importance of each of two or more electronic invite entries to the single user based on a determination as to a level of urgency of each of two or more electronic invite entries.

17. The method of claim 2, wherein the heuristic scoring, for each the two or more electronic invite entries, is an aggregate score from generation of the first heuristic scoring metric, the second heuristic scoring metric and a third heuristic scoring metric that scores the importance of each of two or more electronic invite entries to the single user based on whether the single user is a required attendee or an optional attendee.

18. The method of claim 2, wherein the heuristic scoring, for each the two or more electronic invite entries, is an aggregate score from generation of the first heuristic scoring metric, the second heuristic scoring metric and a third heuristic scoring metric that scores the importance of each of two or more electronic invite entries to the single user based on a determination as to a level of urgency of each of two or more electronic invite entries.

19. The computer-implemented method of claim 11, wherein the heuristic scoring, for each the two or more electronic invite entries, is an aggregate score from generation of the first heuristic scoring metric, the second heuristic scoring metric and a third heuristic scoring metric that scores the importance of each of two or more electronic invite entries to the single user based on whether the single user is a required attendee or an optional attendee.

20. The computer-implemented method of claim 11, wherein the heuristic scoring, for each the two or more electronic invite entries, is an aggregate score from generation of the first heuristic scoring metric, the second heuristic scoring metric and a third heuristic scoring metric that scores the importance of each of two or more electronic invite entries to the single user based on a determination as to a level of urgency of each of two or more electronic invite entries.

* * * * *